(12) United States Patent
Anderson et al.

(10) Patent No.: US 7,515,155 B2
(45) Date of Patent: Apr. 7, 2009

(54) STATISTICAL DYNAMIC MODELING METHOD AND APPARATUS

(75) Inventors: John Anderson, San Anselmo, CA (US); Adam Woodbury, San Francisco, CA (US)

(73) Assignee: Pixar, Emeryville, CA (US)

(*) Notice: Subject to any disclaimer, the term of this patent is extended or adjusted under 35 U.S.C. 154(b) by 0 days.

(21) Appl. No.: 11/582,704

(22) Filed: Oct. 17, 2006

(65) Prior Publication Data
US 2007/0035547 A1 Feb. 15, 2007

Related U.S. Application Data

(63) Continuation of application No. 10/438,748, filed on May 14, 2003.

(51) Int. Cl.
*G06T 15/70* (2006.01)
(52) U.S. Cl. .................... 345/473; 345/474
(58) Field of Classification Search ............ None
See application file for complete search history.

(56) References Cited

U.S. PATENT DOCUMENTS

| | | | | |
|---|---|---|---|---|
| 6,011,562 | A * | 1/2000 | Gagne et al. | 345/473 |
| 6,606,095 | B1 * | 8/2003 | Lengyel et al. | 345/473 |
| 6,798,415 | B2 | 9/2004 | Lake et al. | |
| 6,822,653 | B2 | 11/2004 | Boyd et al. | |
| 7,088,367 | B2 | 8/2006 | Boyd et al. | |
| 7,091,975 | B1 | 8/2006 | Cohen et al. | |
| 2003/0193503 | A1 | 10/2003 | Seminatore et al. | |
| 2004/0046760 | A1 | 3/2004 | Roberts et al. | |

OTHER PUBLICATIONS

Capell, Steve et al.; "Interactive Skeleton-Driven Dynamic Deformations", *ACM SIGGRAPH*, 2002, San Antonio, TX.
Delura et al., "Game Programming Gems" *Charles River Media Inc.*, pp. 476-483, vol. 1. Capell, Steve et al.; "Interactive Skeleton-Driven Dynamic Deformations"; 2002, *ACM SIGGRAPH*, San Antonio, TX.
Hirota, et al., "An implicit finite element method for elastic solids in contact", *Computer Animation, 2001, The Fourteenth Conference on Computer Animation, Proceedings*, Nov. 7-8, 2001, pp. 136-146.
James, Doug L. et al.; "DyRT: Dynamic Response Textures for Real Time Deformation Simulation with Graphics Hardware"; *Department of Computer Science, University of British Columbia*, 4 pages.

(Continued)

*Primary Examiner*—Ulka Chauhan
*Assistant Examiner*—Daniel F Hajnik
(74) *Attorney, Agent, or Firm*—Law Office of Jonathan Hollander PC

(57) ABSTRACT

A method for animating soft body characters has a preparation phase followed by an animation phase. In the preparation phase, the skin deformation of the character model is determined for a set of basis poses. The skin deformation from posing is compactly represented in terms of the set of basis poses. In the animation phase, the set of basis poses and the skin mode response are used to create a final posed character. A desired character pose is projected onto the basis set to determine a set of basis weights. The basis weights are applied to the set of skin responses to create a skin pose response, and the skin pose responses is projected onto the basis set to create the posed character model.

31 Claims, 29 Drawing Sheets

OTHER PUBLICATIONS

Kry, Paul G. et al.; "EigenSkin: Real Time Large Deformation Character Skinning Hardware"; *University of British Columbia*, 7 pages.

Sloan, Peter-Pike J. et al., "Shape By Example", *Symposium on Interactive 3D Graphics archive, Proc of the 2001 symposium on Interactive 3D graphics table of contents*, pp. 135-143, Pub. 2001.

Terzopoulos, et al., "Elasticity deformable models", *ACM SIGGRAPH Computer Graphics, Proc of the 14th annual conference on Computer graphics and interactive techniques*, Aug. 1987, pp. 205-214, vol. 21(4).

Wang, et al., "Skinning: Multi-weight enveloping:least squares approximation techniques for skin animation", *Proceedings of the 2002 ACM SIGGRAPH?Eurographics symposium on Computer animation*, pp. 129-138, and 197, vol. 21(4).

Wilson, Andrew D., "Luxomatic: Computer Vision for Puppeteering", *Technical Report 512. MIT Media Lab.*, Pub. 1999.

\* cited by examiner

STATISTICAL DYNAMIC MODELING METHOD AND APPARATUS

CROSS REFERENCES TO RELATED APPLICATIONS

This application is a continuation of U.S. patent application Ser. No. 10/438,748, filed May 14, 2003, entitled "Statistical Dynamic Modeling Method and Apparatus" for which is herein incorporated by reference for all purposes.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Animation, whether hand-drawn or computer generated, is as much an art as it is a science. Animators must not only make a scene look realistic, but must also convey the appropriate dramatic progression and emotional impact required by the story. This is especially true when animating characters. Characters drive the dramatic progression of the story and establish an emotional connection with the audience.

To create artistically effective character animation, an animator often creates a rough version of a scene and then fine-tunes the character animation to create desired drama and expression of the final scene. This is analogous to a movie director rehearsing a scene with actors to capture the perfect mood for a scene. Because the animator is responsible for the expressiveness of the character animation, it is important that animation tools allow the animator to efficiently fine-tune a character animation and to accurately preview the final form of the animation.

In computer-generated animation, a character's appearance is defined by a three-dimensional computer model. To appear realistic, the computer model of a character is often extremely complex, having millions of surfaces and hundreds or thousands of attributes. Due to the complexity involved with animating such complex models, animation tools often rely on armatures and animation variables to define character animation. An armature is a "stick figure" representing the character's pose, or bodily attitude. By moving the armature segments, which are the "sticks" of the "stick figure," the armature can be manipulated into a desired pose. As the armature is posed by the animator, the animation tools modify character model so that the bodily attitude of the character roughly mirrors that of the armature.

Animation variables are another way of defining the character animation of a complex character model. An animation variable is a parameter used by a function to modify the character models. Animation variables and their associated functions are used to abstract complicated modifications to a character model to a relatively simple control. For example, an animation variable can define the degree of opening of a character's mouth. In this example, the value of the animation variable is used to determine the position of the many different parts of the character's armature needed to open the character's mouth to the desired degree. The animation tools then modify the character model according to the final posed armature to create a character model with an open mouth.

There are many different approaches for creating a final posed character model from an armature. One prior approach is to associate points on the character model to one or more armature segments. As the armature is moved into a pose, the points associated with each armature segment are kinematically transformed to a new position based on the position of its associated posed armature segments. Because this kinematic transformation can be performed rapidly, animators can preview and fine-tune their animations interactively in real-time or near real-time. However, the animation resulting from kinematic transformations often appears stiff and "puppet-like."

Further, many characters, such as humans and animals, are deformable soft objects. Kinematic transformations perform particularly poorly with "soft body" objects because they are unable to accurately simulate the deformation of characters. This makes it difficult for characters to bend and bulge realistically as they are posed. Additionally, when kinematic transforms are applied to soft body objects, cracks and seams often develop on the model surface at the character joints. Additional armature segments can be added to simulate bending and bulging surfaces and to smooth out the model surfaces at the joints; however, it is time consuming to create these additional armature segments and the final posed character will often require extensive manual fine-tuning to make the bending and bulging look realistic.

As an alternative to animating soft body characters using kinematic transformations, soft body characters can be animated using a physical simulation approach. In the physical simulation approach, the character model is processed by a material physics simulation to create a physically realistic looking soft body object. This approach is extremely time consuming to set up, often requiring modelers to define not only the exterior of a character, such as the skin, but also the underlying muscles and skeleton. Additionally, processing the character model for each pose created by the animator is extremely computationally expensive, often requiring hours or even days to compute the character model's deformation for a short animated sequence.

Because of the time consuming nature of the animation process, animators often have to create scenes using simplified "stand-in" models and then wait to see the resulting animation with the final character model. Because the animators cannot immediately see the final results of their animation, it is very difficult and inefficient to fine-tune the expressiveness of the character. With this technique, the animator is essentially working blind and can only guess at the final result.

Animated characters also often collide or interact with other objects or characters in a scene. In order to make a collision look realistic, an animated character will need to deformed around the colliding object. Realistic character deformation in response to collisions is essential in animating collisions, especially when the character is a soft body object. Prior character posing techniques such as kinematic transforms cannot realistically deform character models in response to collisions. Instead, animators must manually deform the shape of the character model. Physical simulation techniques can be used to deform character models in response to collisions; however, as discussed above, physical simulation techniques are very time-consuming to set up and computer. Because the time requirements of physical simulation techniques are so high, it is difficult for animators to fine tune collision animations to convey the appropriate dramatic impact.

It is desirable to have a method and system for animating soft body characters that 1) realistically deforms soft body characters in response to armature poses; 2) is easy for animators operate; 3) can be quickly evaluated so that animators can efficiently fine-tune the animation; and 4) allows the animator to preview the final appearance of the character model. It is further desirable for the soft body character to deform realistically from collisions with itself or external objects.

BRIEF SUMMARY OF THE INVENTION

A method for animating soft body characters has a first character preparation phase followed by a second character animation phase. In the character preparation phase, the skin deformation of the character model is determined for each of a set of basis poses. The character deformation phase also determines the skin deformation of a character model at a number of skin contact points in response to impulse collisions. In an embodiment of the invention, the skin deformation from posing, referred to as the skin mode response, and the skin deformation from impulse collisions, referred to as the skin impulse response, are compactly represented in terms of the set of basis poses.

In the character animation phase, the set of basis poses, the skin mode response, and the skin impulse response are used to create a final posed character. Regardless of the desired character pose, the character animation phase uses the same set of basis poses, skin mode response, and the skin impulse response. Therefore, the set of basis poses, the skin mode response, and the skin impulse response only need to be determined once for a character model.

In an embodiment, a method for animating a character model includes determining a basis set from a set of character poses and determining a set of skin responses for the character model corresponding to the basis set. A desired character pose is projected onto the basis set to determine a set of basis weights. The basis weights are applied to the set of skin responses to create a skin pose response, and the skin pose responses is projected onto the basis set to create the posed character model. In an additional embodiment, the steps of projecting a character pose, applying the set of basis weights, and projecting the set of skin responses are repeated for a second desired character pose to create a second posed character model.

In an embodiment, the set of character poses includes poses from a training set. In another embodiment, the set of character poses includes randomly created poses. In yet another embodiment, an armature is used to define the set of character poses as well as the desired character pose. In a further embodiment, an animation variable defines at least part of a desired pose.

In an embodiment, determining the skin response includes applying a set of displacements from pose in the basis set to a portion of the character model and minimizing a function of the displacement over the entire character model. In an embodiment, the function is an elastic energy function. In a further embodiment, the function is minimized over a set of sample points associated with the character model.

An embodiment of the method transforms a character pose into a set of reference frames associated with a character model. For each reference frame, a skin pose response of the character model is created in response to the character pose. The embodiment constructs a composite skin response of the character model from the skin pose responses of each reference frame.

A further embodiment constructs a composite skin response by combining a portion of the skin response of a first reference frame with a portion of the skin response of a second reference frame. The portion of the skin response of the first reference frame and the portion of the skin response of the second reference frame can correspond to two, at least partially overlapping regions of the character model. Alternatively, the portion of the skin response of the first reference frame and the portion of the skin response of the second reference frame correspond to two different regions of the character model.

Another embodiment combines the portion of the skin response of a first reference frame and the portion of the skin response of the second reference frame according to a set of frame weights defining the influence of the skin responses of the first and second reference frames on the composite skin response. Yet another embodiment determines a set of frame weights by diffusing an initial set of frame weight values through the character model.

BRIEF DESCRIPTION OF THE DRAWINGS

The invention will be described with reference to the drawings, in which.

It should be noted that although the figures illustrate the invention in two dimensions for the sake of clarity, the invention is generally applicable to the manipulation of three-dimensional computer models.

DETAILED DESCRIPTION OF THE INVENTION

Figure 1:
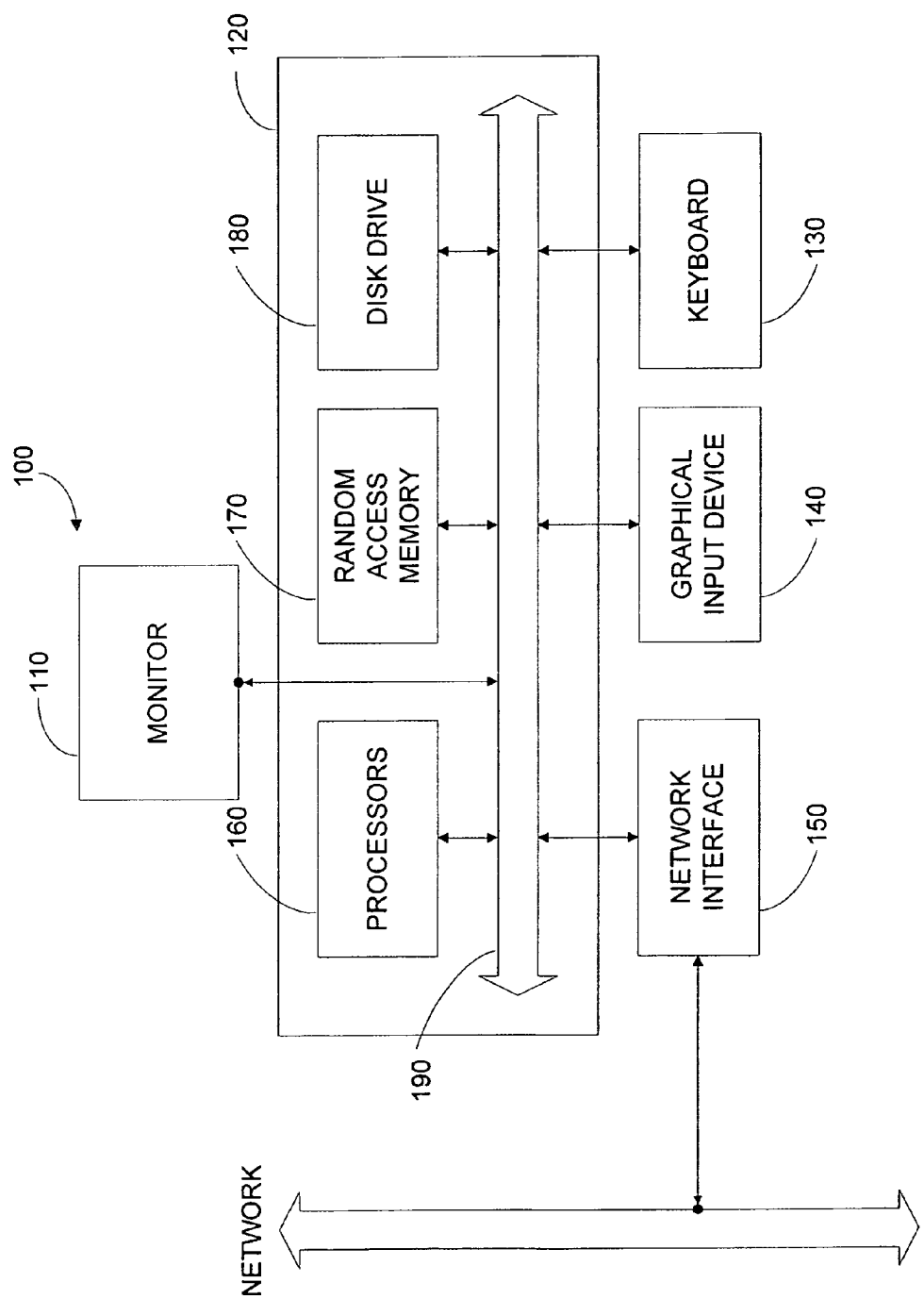
FIG. 1 illustrates an example computer system capable of implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
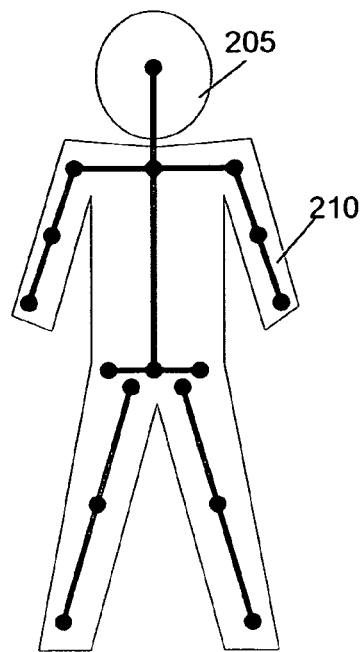
FIGS. 2A and 2B illustrate an example character and an example armature used for posing the example character.
Figure 2B:
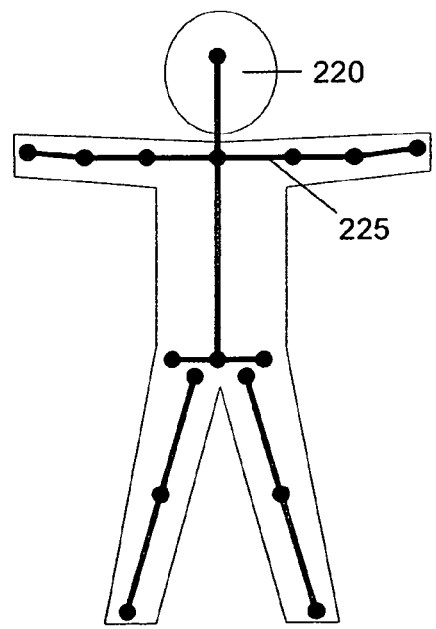

FIGS. 2A and 2B illustrate an example character and an example armature used for posing the example character. Character 205 is a three-dimensional computer model of a soft-bodied object, shown in two dimensions for clarity. Although character 205 is shown to be humanoid in shape, character 205 may take the form of any sort of object, including plants, animals, and inanimate objects with realistic and/or anthropomorphic attributes. Character 205 can be created in any manner used to create three-dimensional computer models, including manual construction within three-dimensional modeling software, procedural object creation, and three-dimensional scanning of physical objects. Character 205 can be comprised of a set of polygons; voxels; higher-order curved surfaces, such as Bezier surfaces or non-uniform rational B-splines (NURBS); constructive solid geometry; and/or any other technique for representing three-dimensional objects. Additionally, character 205 can include attributes defining the outward appearance of the object, including color, textures, material properties, transparency, reflectivity, illumination and shading attributes, displacement maps, and bump maps.

Character 205 is animated through armature 210. Armature 210 includes one or more armature segments. The armature segments can be connected or separate, as show in FIG. 2A. Animators manipulate the position and orientation of the segments of armature 210 to define a pose for the character. A pose is a set of armature positions and orientations defining the bodily attitude of character 205. Armature segments can be constrained in size, position, or orientation, or can be freely manipulated by the animator. The number of armature segments can vary according to the complexity of the character, and a typical character can have an armature with hundreds or thousands of segments. In some cases, the number and position of armature segments is similar to that of a "skeleton" for a character; however, armature segments can also define subtle facial expressions and other character details not necessarily associated with bones or other anatomical features. Additionally, although the armature segments in the armature 210 of FIG. 2A are comprised of a set of points, in alternate embodiments of the invention the armature segments can be comprised of a set of surfaces and/or a set of volumes. As the armature 210 is posed by the animator, the bodily attitude of character 205 roughly mirrors that of the armature 210.

Character 205 is animated by creating a sequence of frames, or still images, in which the character 205 is progressively moved from one pose to another. Character 205 can also be translated, rotated, scaled, or otherwise manipulated as a whole between frames. Animators can manually create the poses of a character for each frame in the sequence, or create poses for two or more key frames, which are then interpolated by animation software to create the poses for each frame. Poses can also be created automatically created using functions, procedures, or algorithms. Animation variables can be used as parameters for one or more functions defining a pose. Character 205 and its associated armature 210 are shown in the rest post, or the default bodily attitude of the character. In an embodiment, the rest pose of a character is determined by the initial configuration of the character model and the armature.

FIG. 2B illustrates a character 220 after being manipulated into a pose by the animator. In this example, the animator has moved the arm segments of armature 225. In response, the character 220 assumes a pose with its arms raised. More complicated poses can be created by manipulating additional armature segments.

Following the creation of an armature pose, the character is processed to mirror the bodily attitude of the armature. The present invention allows for interactive frame rates and realistic posing of soft body characters by dividing the animation process into two phases.

Figure 3:
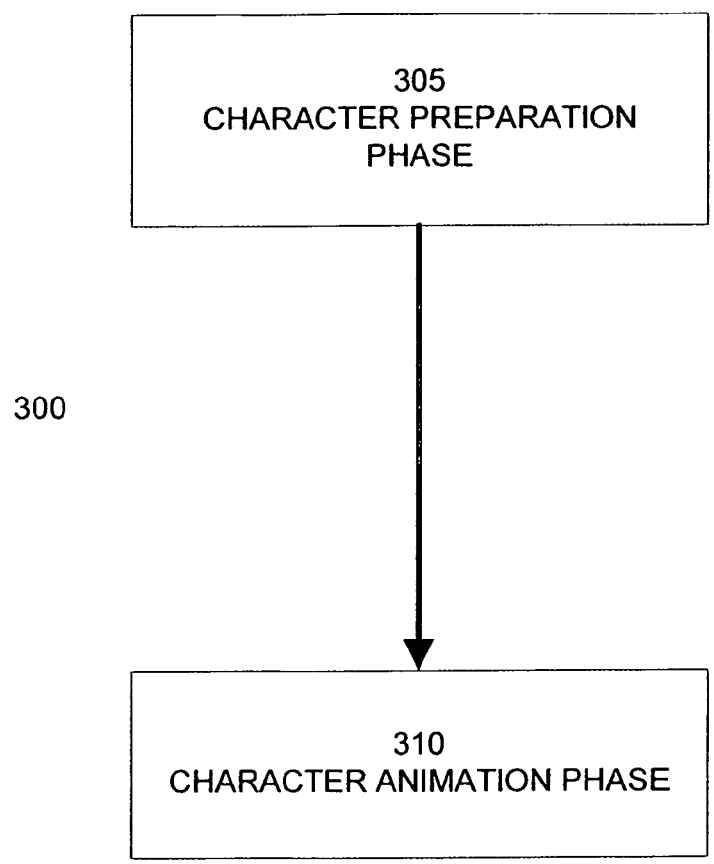
FIG. 3 is a block diagram illustrating two phases of a method of animating a character according to the embodiment of the invention.

FIG. 3 is a block diagram 300 illustrating two phases of a method of animating a character according to the embodiment of the invention. The first phase 305 is a character preparation phase. The character preparation phase is relatively computationally expensive and is performed in advance of any animation. The character preparation phase 305 creates a set of mode data for the character defining the deformation of the character to numerous poses.

Following the completion of the character preparation phase 305, animators animate the characters is character animation phase 310. In the character animation phase 310, animators create animated sequences for characters by defining the armature pose of a character in a frame. A final posed character is created from the armature pose defined by the animator and the set of mode data previously created in character preparation phase 305. An embodiment of the invention creates a final posed character from an armature pose and the set of mode data in real-time, allowing the animator to preview the result. Regardless of the desired character pose, character animation phase uses the same set of mode data to create the final posed character. Therefore, the character preparation phase 305 only needs to be performed one time for a character. The character animation phase 310 is repeated to create a final posed character for each armature pose in an animated sequence.

Figure 4:
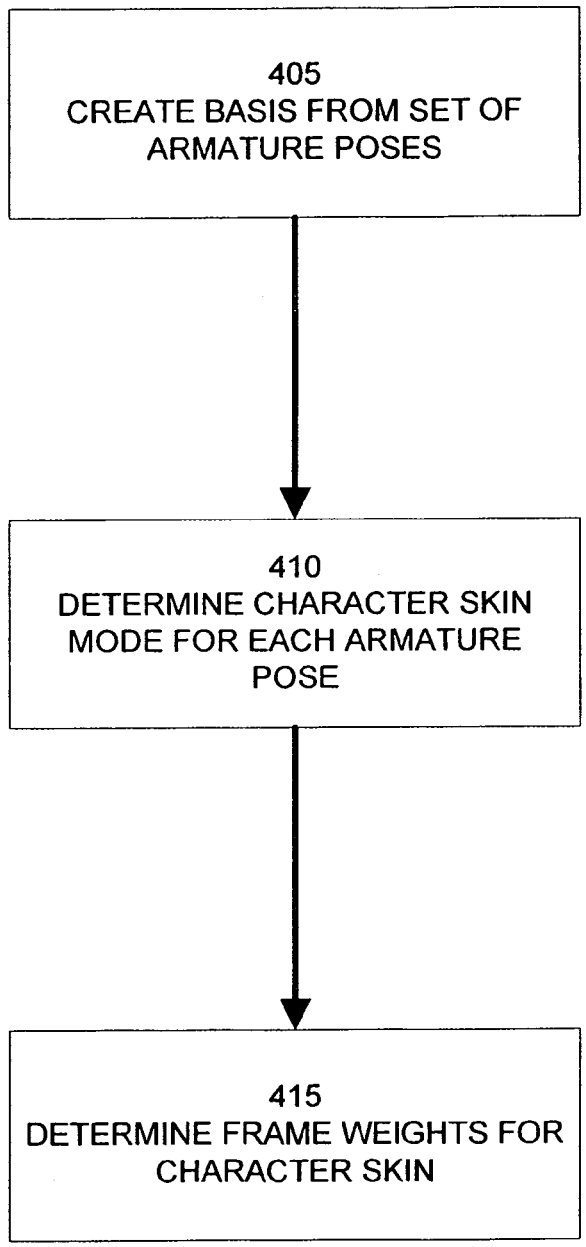
FIG. 4 is a block diagram of a character preparation phase for animating a character according to an embodiment of the invention.

FIG. 4 is a block diagram 400 of the character preparation phase for animating a character according to an embodiment of the invention. Step 405 creates a basis from a set of sample armature positions. In this step, a set of sample armature positions is created for an armature associated with a character. In an embodiment, the set of sample armature positions includes poses from a training set defining typical actions of a character. For example, the set of sample armature positions might include armature poses associated with actions such as walking, running, grasping, jumping, and climbing. In an alternate embodiment, the set of sample armature positions are programmatically created. Sample armature positions can be created procedurally by selecting one or more armature segments and manipulating these segments to new positions or orientations. For example, each armature segment is selected in turn and moved one unit in a given dimension to create a sample armature position. In this example, there will be a total number of sample armature positions in the set will be three times the number of armature segments. In a further embodiment, armature segments adjacent to the selected armature segment are also repositioned according to an elastic model as each sample armature position is created. In yet a further embodiment, a sample armature position takes into consideration constraints on the armature segments. For example, an armature segment may have a limited range of motion.

Each sample armature position is described by a vector defining the position of the armature segments. In an embodiment, the vector defines the position of armature segments relative to their position in a rest or initial position. The vectors of each sample armature position are combined to form a matrix containing the set of sample armature positions for the armature. A single value decomposition of this matrix is calculated to find a set of basis functions (or modes) for the armature. In alternate embodiments, other methods of calculating a set of basis functions, such as a canonical correlation, can also be used. The set of basis functions compactly defines a "pose space," in which any pose can be approximately represented as the weighted sum of one or more of the basis functions. In a further embodiment, if the resulting set of basis functions is not an orthonormal basis, the set of basis functions are ortho-normalized so that each basis function has a magnitude of 1 and is perpendicular to every other basis function.

Following the creation of a set of basis functions in step 405, a skin mode response is determined for each of the sample armature position basis functions in step 410. A skin mode response is the deformation of the surface of the character in response to the movement of the armature to a sample armature position from its rest pose.

Figure 5:
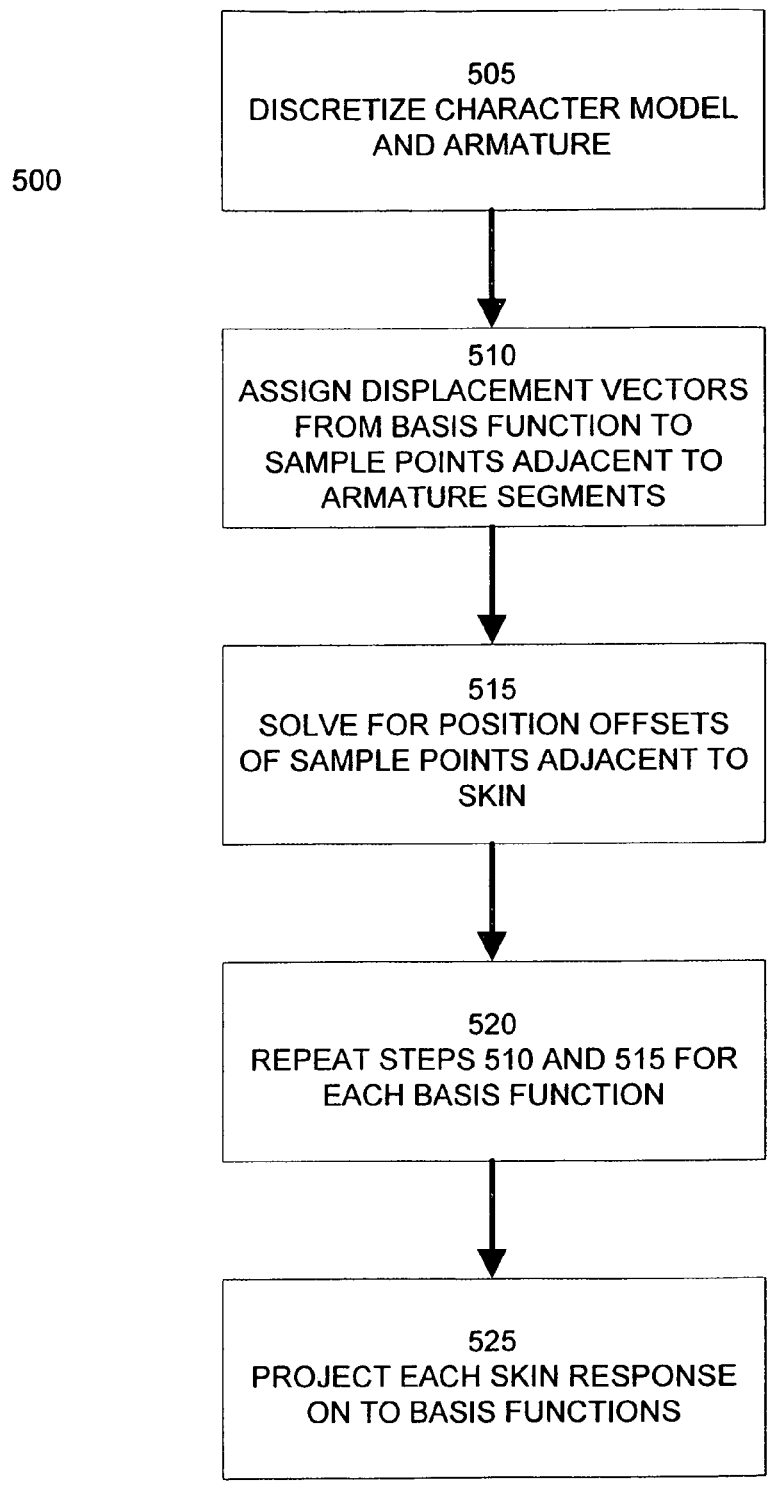
FIG. 5 illustrates a block diagram of a method for determining the skin mode response of a character according to an embodiment of the invention.

FIG. 5 illustrates a block diagram 500 of a method for determining the skin mode response of a character as called for by step 410 according to an embodiment of the invention. At step 505, the character model and its armature are discretized to create a set of sample points. In an embodiment, the character model is discretized into a three-dimensional grid. In this embodiment, the grid points within the character model or adjacent to the armature are the set of sample points.

In an alternate embodiment, the character model is discretized into a set of tetrahedral cells. In this embodiment, a set of tetrahedrons are fitted within the character model and around the armature. The vertices of the tetrahedrons are the set of sample points. These embodiments are intended as examples and any type of discretization can be used by step 505, including finite-element, finite volume, and sum-of-spheres discretizations.

Figure 6A:
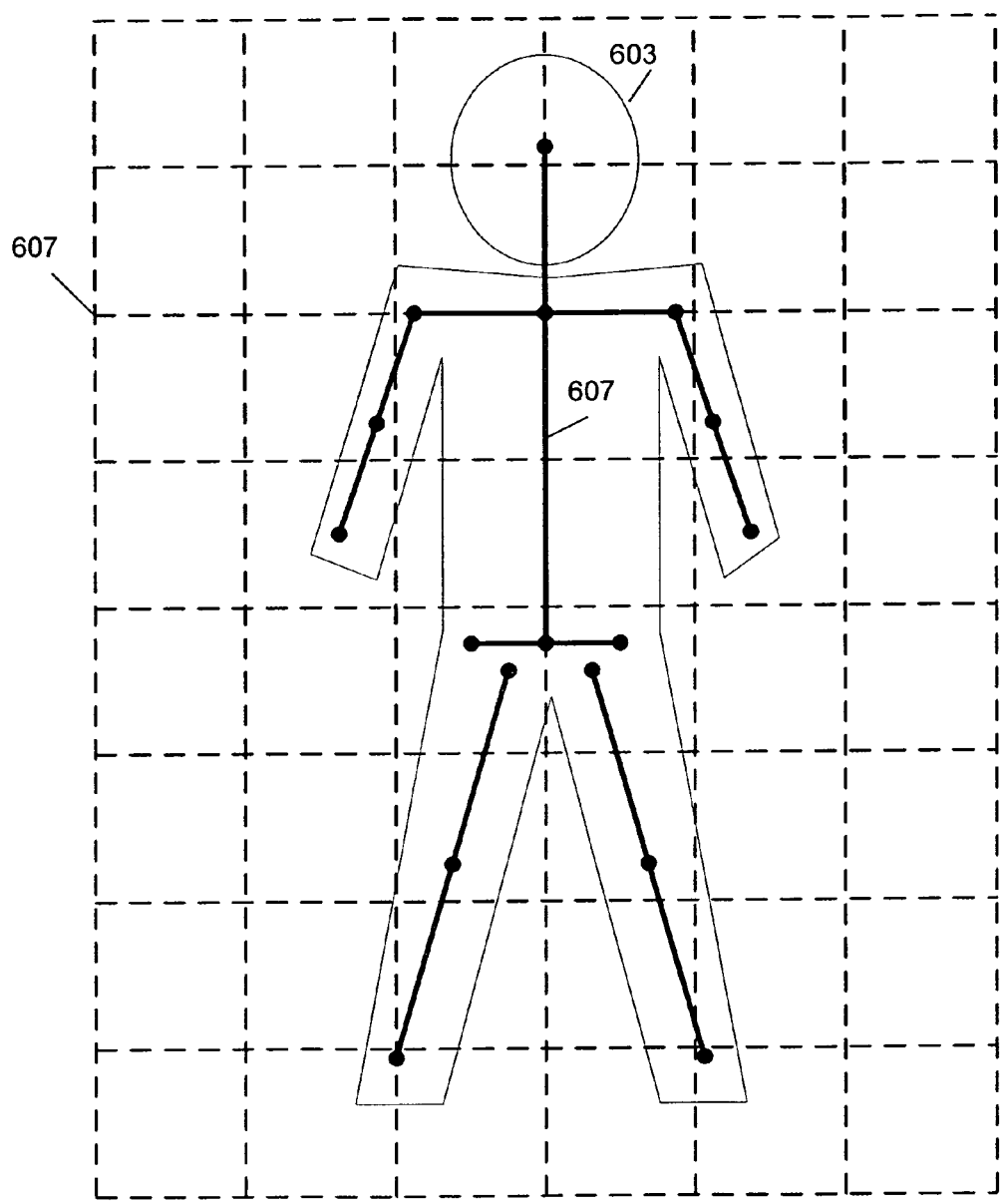
FIGS. 6A, 6B, 6C, 6D, and 6E illustrate the determination of a skin mode response of an example character in an example pose according to an embodiment of the invention.

In an example application of step 505, FIG. 6A shows a character model 603 and its associated armature 605 discretized with a three-dimensional grid 607. The character model 603 and its armature 605 are in the rest position. Although shown in two-dimensions, grid 607 is a three-dimensional grid. Additionally, the density of the grid 607, i.e. the number of grid cubes per unit of volume, is shown in FIG. 6A for illustration purposes only. Depending on the size and the relative proportions of the character model 603, a typical grid forms a bounding box around the character approximately 120 cubes high, 50 cubes wide, and 70 deep. These dimensions will vary according to the height, width and depth of the character model 603.

Figure 6B:
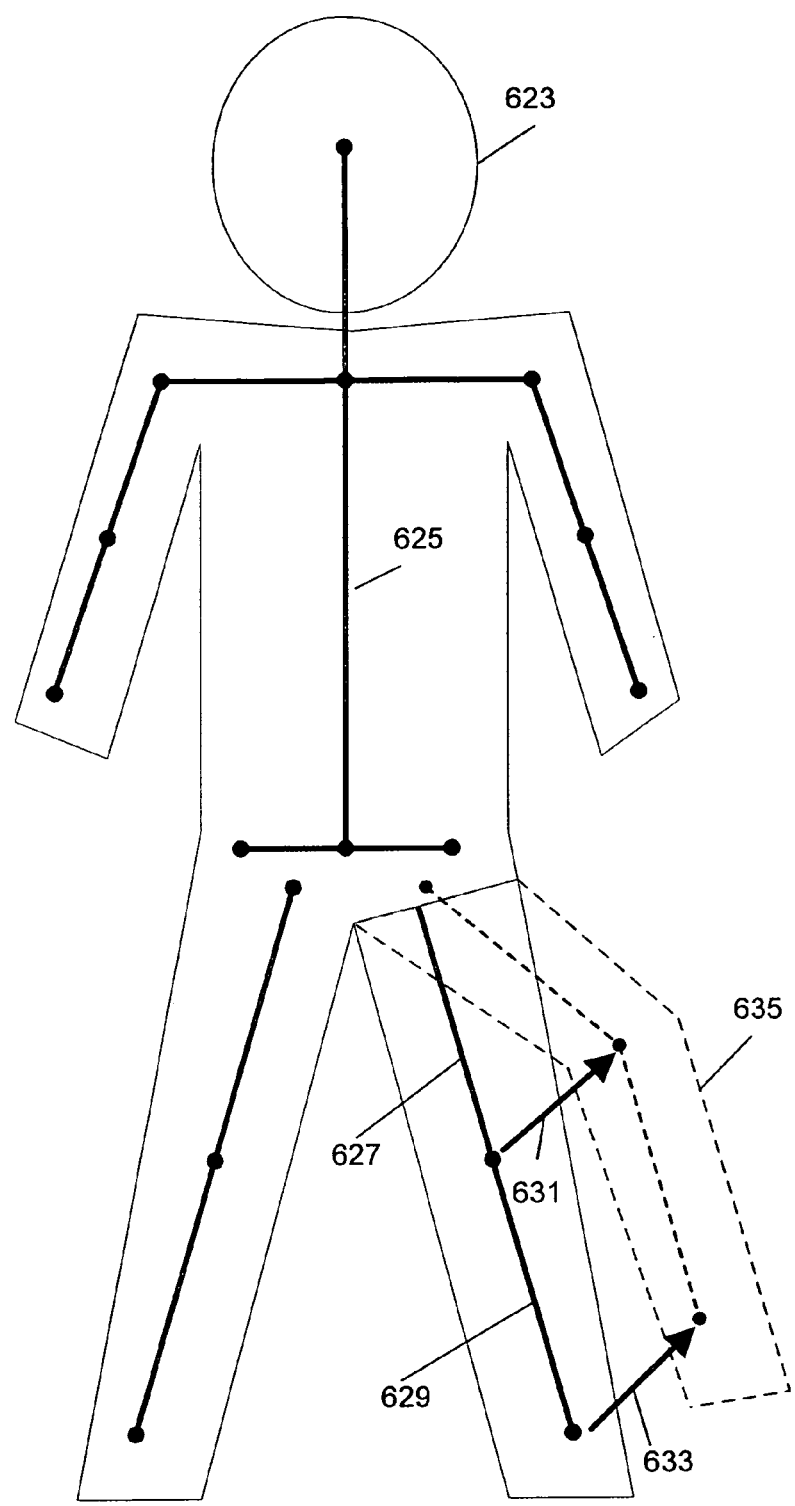

In a further embodiment, the density of the grid may vary over different portions of the character 603 to ensure accuracy in more complicated portions of character, for example, the character's face and hands. It should be noted that the grid 607 not only surrounds the character model 603, but also fills the interior of character model 603 as well. In a further embodiment, grid elements completely outside the character model 603 are discarded, while grid elements either partially or completely inside the character model are retained for determining the skin mode response. This reduces the processing and memory requirements for determining the skin model response FIG. 6B illustrates a sample armature position associated with a basis function for an example armature 625 and its associated character model 623. In this example, the armature segments 627 and 629 are positioned into a new position. Displacement vectors 631 and 633 define the displacement of the armature segments 627 and 629, respectively, from the rest pose. Outline 635 illustrates the portion of the character model 623 affected by the armature displacement for the rest position into the sample armature position.

At step 510, the displacement vectors from the sample armature positions are assigned to sample points adjacent to armature segments.

Figure 6C:
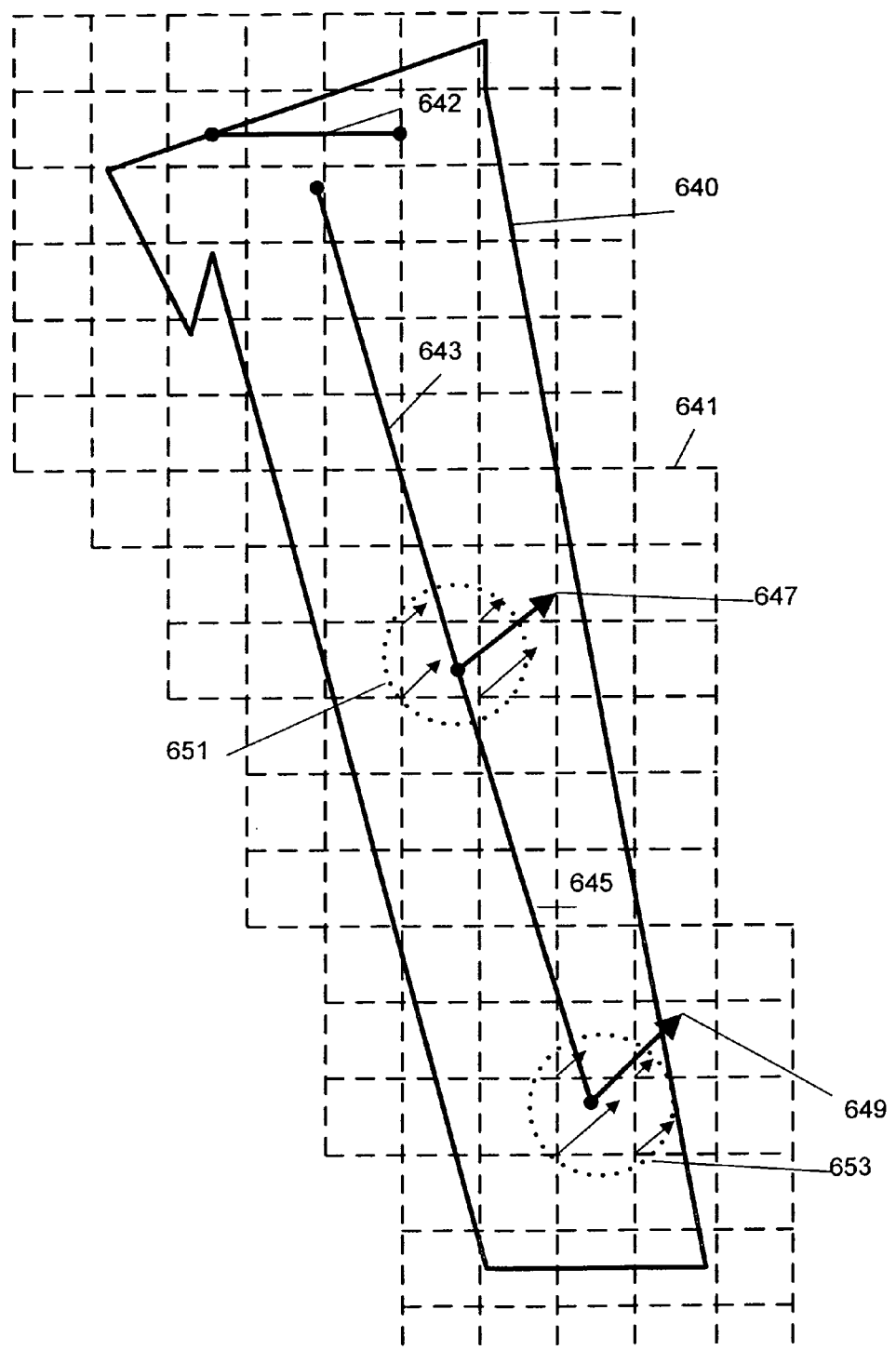

In an example application of step 510, FIG. 6C illustrates the assignment of displacement vectors to sample points adjacent to armature segments. FIG. 6C illustrates a portion 640 of a character model, its associated armature 642, and the surrounding grid 641. Armature segments 643 and 645 are shown in their rest pose. The armature displacement vectors, 647 and 649, are associated with armature segments 643 and 645 respectively.

The sample points adjacent to armature displacement vector 647 are each assigned a displacement vector, illustrated by the set of displacement vectors 651. The values of the displacement vector are computed so that the weighted sum of the set of grid displacement vectors 651 is equal to the armature displacement vector 647. Similarly, a set of displacement vectors 653 are assigned to the sample points adjacent to armature displacement vector 649. Displacement vectors are computed for all sample points adjacent to any portion of any armature segments. If armature displacement vectors are only defined for the endpoints of an armature segment, the armature displacement vectors are interpolated along the length of the armature segment. The interpolated armature displacement vector is then used to create a set of displacement values for the sample points adjacent to each portion of the armature.

In an embodiment where grid 641 is a three-dimensional Cartesian grid, each armature displacement vector has eight adjacent displacement vectors. In an alternate embodiment using a tetrahedral discretization, each armature displacement vector has four adjacent displacement vectors.

It should be noted that the armature displacement vectors and the displacement vectors assigned to sample points in FIG. 6C are not shown to scale. Furthermore, the magnitudes of the displacement vectors is assumed to be infinitesimally small. Consequently, the sample points are not actually moved from their initial positions by the displacement vectors. Instead, the assigned displacement vectors represent a "virtual displacement" of their associated sample points.

At step 515, the skin mode response, which is the deformation of the skin of the character model, is computed using the displacement vectors assigned in step 510 as initial input values. In an embodiment, the skin mode response is computed by determining the value of an elastic energy function over every sample point inside the character body. One example elastic energy function is:

$$E^2 = V \left| \frac{\partial q_x}{\partial x} + \frac{\partial q_y}{\partial y} + \frac{\partial q_z}{\partial z} \right|^2 + S\left[ \left( \frac{\partial q_x}{\partial y} + \frac{\partial q_y}{\partial x} \right)^2 + \left( \frac{\partial q_x}{\partial z} + \frac{\partial q_z}{\partial x} \right)^2 + \left( \frac{\partial q_y}{\partial z} + \frac{\partial q_z}{\partial y} \right)^2 \right]$$

In this example elastic energy function, $q_{xyz}(x,y,z)$ is the displacement of a sample point from its rest position of $(x,y,z)$. V is a parameter denoting resistance of the model to volume change and S is a parameter denoting resistance to internal shear. The values of V and S can be varied to change the deformation characteristics for the character. Characters that are very soft or "squishy" have low values of V and S, while characters that are relatively more rigid will have larger values of V and S.

Material behavior can be represented in general by a Hamiltonian dynamics system, and any type of Hamiltonian function can be used as an energy function in step 515. In another embodiment, the energy function includes local terms, which change the energy of the system in response to local deformations, such as shown in the example above, and additional global terms, which change the energy of the system in response to changes to the character model as a whole, such as global volume preservation terms.

Using the displacement values assigned to sample points adjacent to armature segments as "seed" values for the set of sample points, a system of equations is created representing the elastic energy of the entire character model. This system of equations is minimized over the set of sample points. The minimization of the elastic energy function can be performed using a numerical solver to find the value of $q_{xyz}$, the position offset, for each sample point. In an embodiment, an elliptic numerical solver is used to minimize the energy function. Alternate embodiments can used conjugate gradient multi-grid or Jacoby solvers. The skin mode is the set of position offsets adjacent to the skin of the model.

Figure 6D:
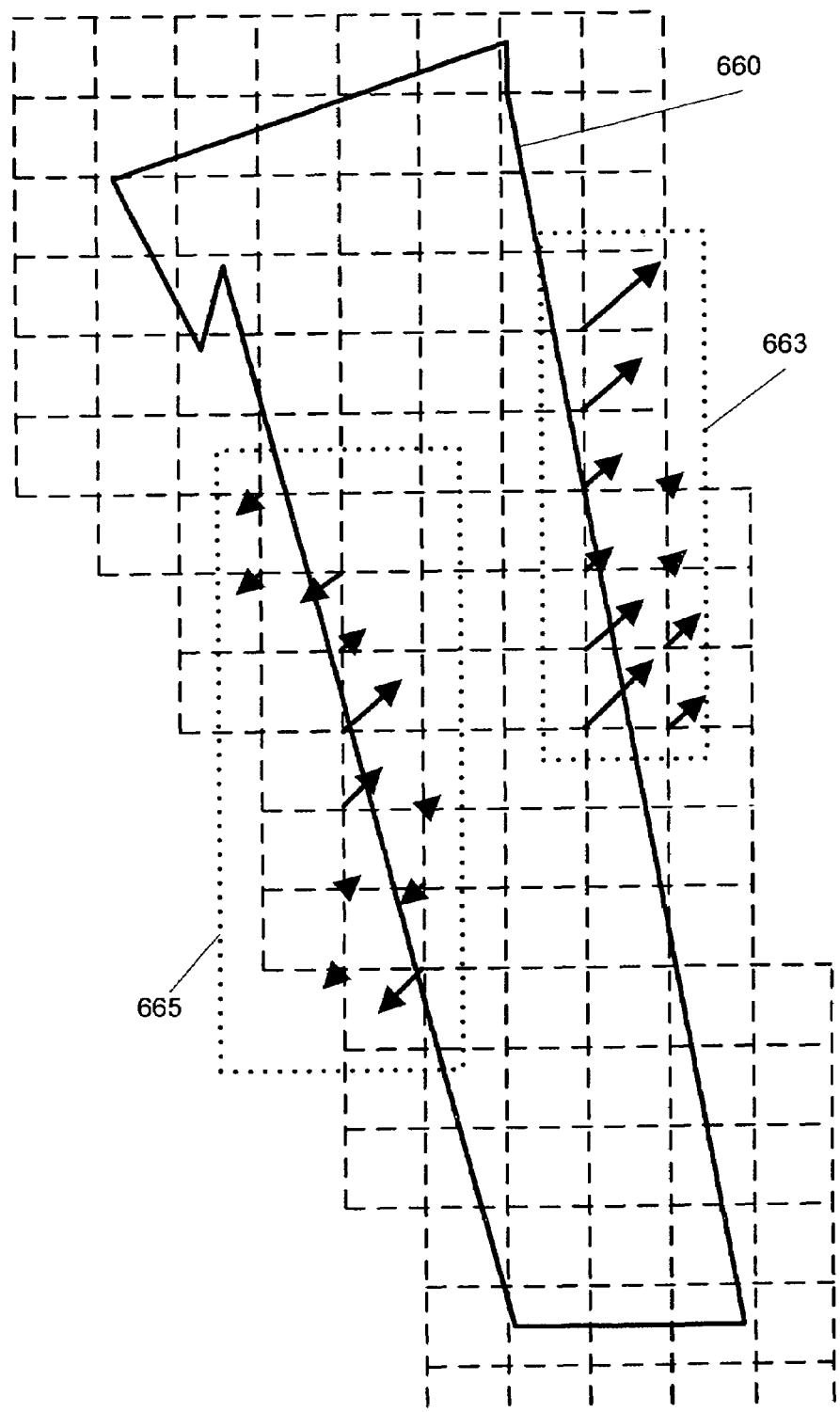

In an example application of step 515, FIG. 6D illustrates an example of a portion of a skin mode response of a character model for a basis function. A portion 660 of a character model is shown in detail. The set of displacement vectors 663 describe the deformation of a portion of the character's skin. In this example, the skin bulges outward around the "knee-cap" of the character. Similarly, the set of displacement vectors 665 describe the deformation of a portion of the character's skin behind the "knee." In this example, the skin creases inward just behind the knee, but bulges outwards just above and below the knee. Although omitted for clarity, displacement vectors are computed for all sample points adjacent to the skin of the character model. In a further embodiment, grid displacement vectors that are zero or very small in value, indicating very little deformation at a skin point from a given basis function, are truncated.

Figure 6E:
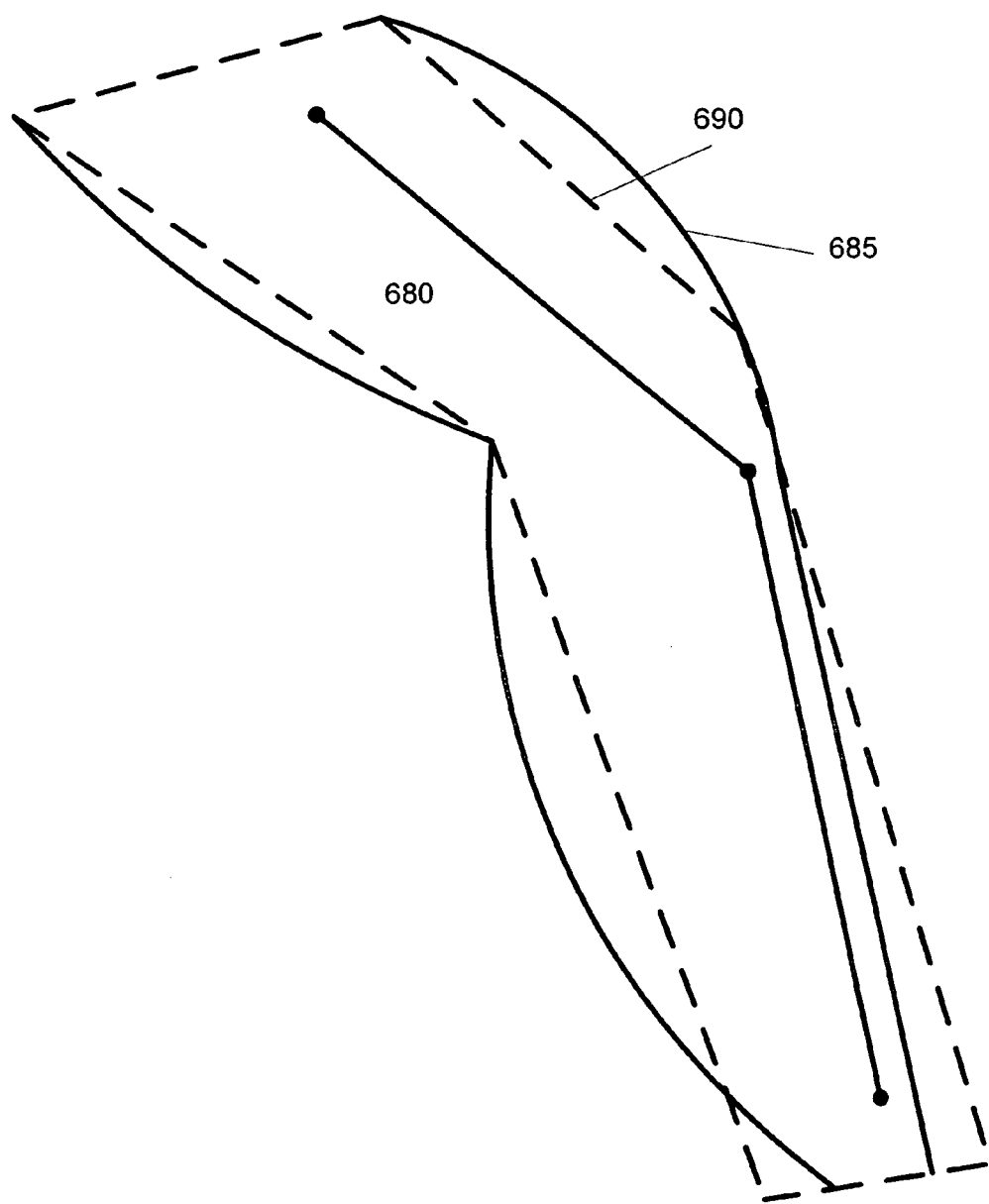

FIG. 6E illustrates the skin mode response of FIG. 6D constructed onto the model skin. This figure is presented to clarify the effects of the skin mode response of FIG. 6D on the appearance of the character model. As discussed below, an embodiment of the invention projects the skin mode response on to the set of basis functions to create a more compact representation. In the example of FIG. 6E, a portion 680 of the character model is shown in detail. The skin 685 bulges outward and inward as a result of the displacement created by the basis function. In this example, the skin mode response presents a realistic looking representation of the deformation of a character's leg as its knee is bent.

Unlike prior physical simulation techniques that require the construction of complex bone and muscle structures underneath the skin of a character to create realistic "bulging" appearance, the present invention determines a realistic skin mode response directly from displacement introduced by the armature basis function. And unlike kinematic transformation techniques, there is no need to explicitly associate skin points with one or more armature segments. Instead, realistic skin deformation automatically results from the displacement of the underlying armature. This decreases the time and effort needed to create character models compared with prior techniques.

For comparison with prior art techniques, an outline 690 of a character surface kinematically transformed by an armature pose is also shown. The kinematically transformed model skin appears rigid and mechanical when compared with the skin mode response of the present example.

At step 520, the process of determining a skin mode response is repeated for each basis function to create a corresponding set of skin mode responses for the set of basis functions. In step 525, the skin mode responses are projected onto the set of basis functions to create a compact representation of the set of skin modes.

In an embodiment of step 525, the positional offsets for sample points adjacent to the armature segments are compared with their original values following the computation of each skin mode. This is done due to the effects of the deformed character model "pushing back" on the armature segments and the effects of separate armature segments pushing into each other. If the sample points adjacent to the armature segments have changed, a new basis function is computed from the set of modified sample points. The new basis function replaces its corresponding original basis function in the set of basis function. The modified set of basis functions is ortho-normalized, and then the skin modes are projected onto the modified, ortho-normalized set of basis function for storage. Following the determination of the skin mode responses for the set of basis functions, the unused positional offsets, which are the positional offsets not adjacent to the skin of the character model, are discarded.

Following the completion of step 410, which results in the determination of a set of skin modes for the set of armature basis functions, step 415 determines a set of frame weights for the character model skin. As discussed in detail below, the set of frame weights are used in the character animation phase to correct for undesired shearing effects introduced by large rotations of portion of the character model.

Figure 7:
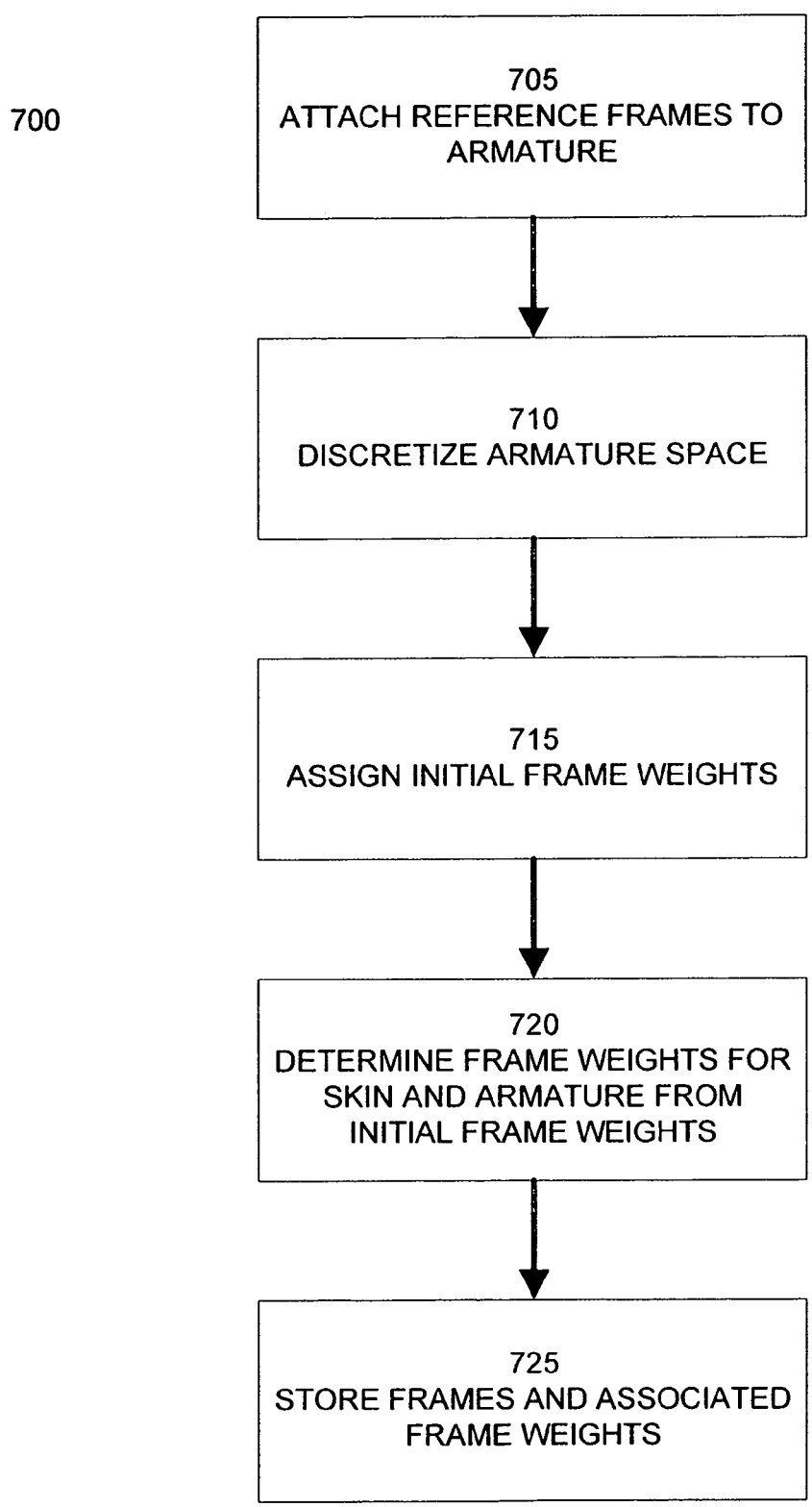
FIG. 7 illustrates a block diagram of a method for weighting a character model with respect to a set of coordinate reference frames according to an embodiment of the invention.

FIG. 7 illustrates a block diagram of a method for weighting a character model with respect to a set of coordinate reference frames according to an embodiment of the invention. At step 705, a set of coordinate reference frames are attached to the segments of the armature. A coordinate reference frame defines a local coordinate system for an armature segment and the adjacent portions of the character model. In an embodiment, a coordinate reference frame is attached to each armature segment. In an alternate embodiment, several armature segments may share the same coordinate reference frame. In an embodiment, a coordinate reference frame is composed of four vectors: a first vector defining the origin or location of the coordinate reference frame and three vectors defining the coordinate axes of the coordinate reference frame.

Figure 8A:
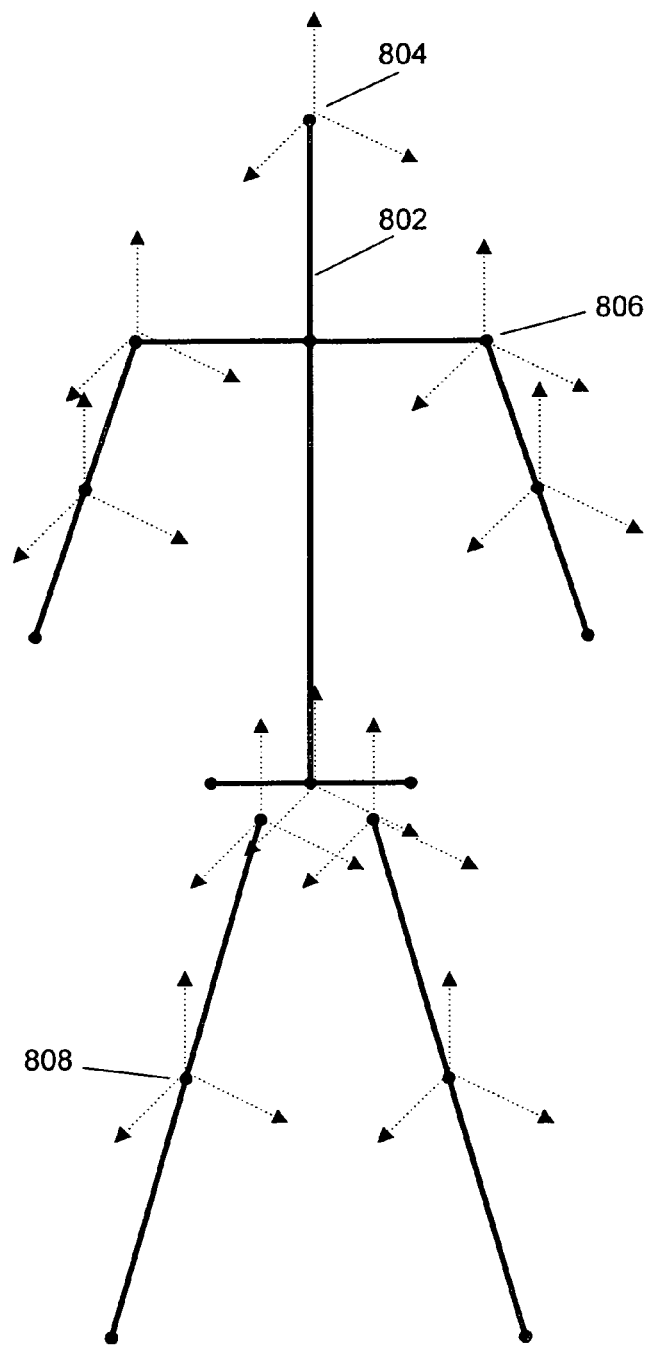
FIGS. 8A, 8B, and 8C illustrate the determination of a set of coordinate reference frame weights of an example character model according to an embodiment of the invention.

FIG. 8A illustrates the attachment of coordinate reference frames to an example armature as called for by step 705. In FIG. 8A, armature 802 is associated with a number of coordinate reference frames, including coordinate reference frames 804, 806, and 808. Each reference frame is attached, or positioned, near an armature segment. In an embodiment, a coordinate reference frame is positioned at the end, or joint, of an armature segment. In an alternate embodiment, armature segments are positioned anywhere along an armature segment.

In the example of FIG. 8A, coordinate reference frame 804 is positioned near the center of the head of the character armature. Coordinate reference frame 806 is positioned at the shoulder joint of the armature 802. Coordinate reference frame 808 is positioned at the knee joint of the armature 802.

At step 710, the armature and the character model are discretized to create a set of sample points. Similar to the discretization discussed above for determining skin mode responses, one embodiment creates a set of sample points from a three-dimensional grid. An alternate embodiment discretizes the character model and armature using a set of tetrahedral cells.

At step 715, a set of initial frame weights are assigned to the sample points adjacent to each coordinate reference frame. A frame weight defines the influence of a coordinate reference frame on a sample point. As discussed below, each sample point can be influenced by more than coordinate reference frame, and therefore can have more than one frame weight. In step 715, the sample points adjacent to a reference frame are initialized with a frame weight of 1. The frame weights of the other sample points that are not adjacent to any of the reference frames are undefined at this stage.

Figure 8B:
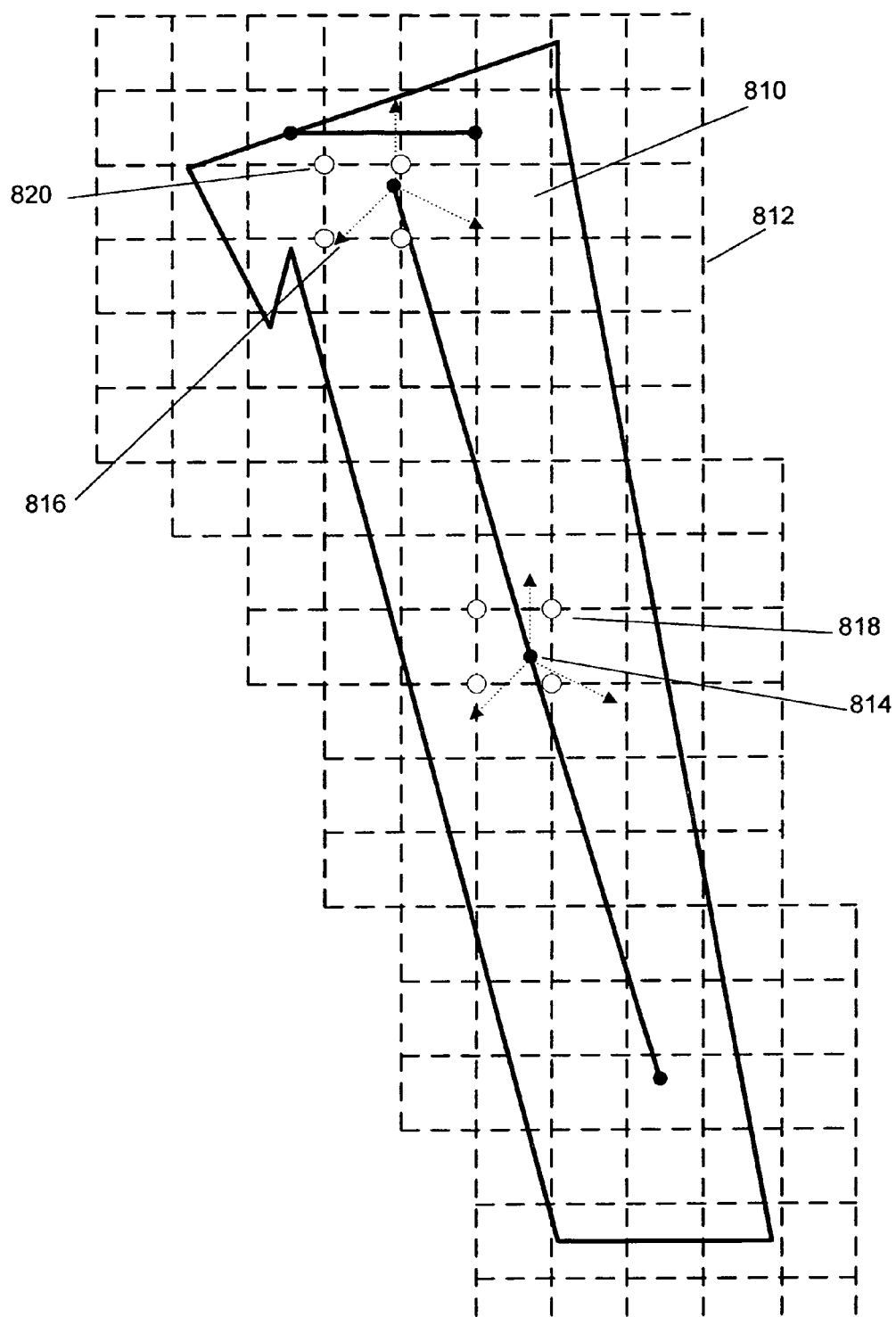

FIG. 8B illustrates an example of the assignment of initial frame weights in a portion of an example character model. FIG. 8B shows a portion of a character model 810 and a portion of a set of sample points 812 created by a three-dimension grid. In this example, coordinate reference frames 814 and 816 are positioned on armature segments. For each coordinate reference frame, the adjacent sample points are assigned a frame weight of 1. For example, sample points 818 are assigned a frame weight of 1 with respect to coordinate reference frame 814, and sample points 820 are assigned a frame weight of 1 with respect to coordinate reference frame 816.

At step 720, the frame weights of the surrounding sample points are determined from the initial frame weights. In an embodiment, a spatial diffusion function is used to calculate the frame weights for sample points. In this embodiment, the initial frame weights values are diffused outward from their initial sample points to the surrounding sample points. As frame weights spread to distant sample points, the frame weight values gradually decrease in value. An example spatial diffusion function is:

$$\frac{\partial w}{\partial t} = D\nabla^2 w$$

In this example, the function $w_{xyz}(x,y,z)$ is frame weight associated with a sample point with respect to a given coordinate reference frame. D is a diffusion coefficient defining the rate of diffusion. In an embodiment, D is uniform in every direction. In an alternate embodiment, the value of D varies according to direction of diffusion. In this alternate embodiment, a variable diffusion coefficient is useful in defining sharp transitions between reference frames at armature joints. In a further embodiment, the diffusion coefficient is selected to be consistent with the diffusion of shear stress in the character model.

Using the initial frame weights as seed values to the set of sample points, a system of equations is created representing the diffusion of frame weights through the entire character model. This system of equations is solved over the set of sample points to find the value of one or more frame weights, $w_{xyz}$, for each sample point. If a sample point is influenced by multiple coordinate reference frames, the sample point will have a corresponding set of frame weights defining the degree of influence from each associated coordinate reference frame. The set of frame weights for each sample point are normalized so that the sum of the frame weights for a sample point is 1.

In an alternate embodiment of steps 715 and 720, an optimal set of frame weights are determined using a full non-linear model accounting for rotational effects. In this embodiment, a non-linear solution of the character model's skin mode response is determined for each of the set of armature basis functions. Unlike the linear solutions computed in step 415, the non-linear solution does not assume the displacement vectors are infinitesimally small. The skin mode of each non-linear solution is compared with the corresponding linear skin mode response for an armature basis function as determined in step 415. From these comparisons of the non-linear skin mode responses with their corresponding linear skin mode responses, an optimal set of frame weights are determined for each sample point.

In a further embodiment, the frame weights determined in steps 715 and 720, for example from a spatial diffusion process or from a non-linear model, are manually adjusted for optimal aesthetic results. For example, the frame weights for sample points located near joints on character models can be fine-tuned so that the deformation of skin points is aesthetically pleasing.

Figure 8C:
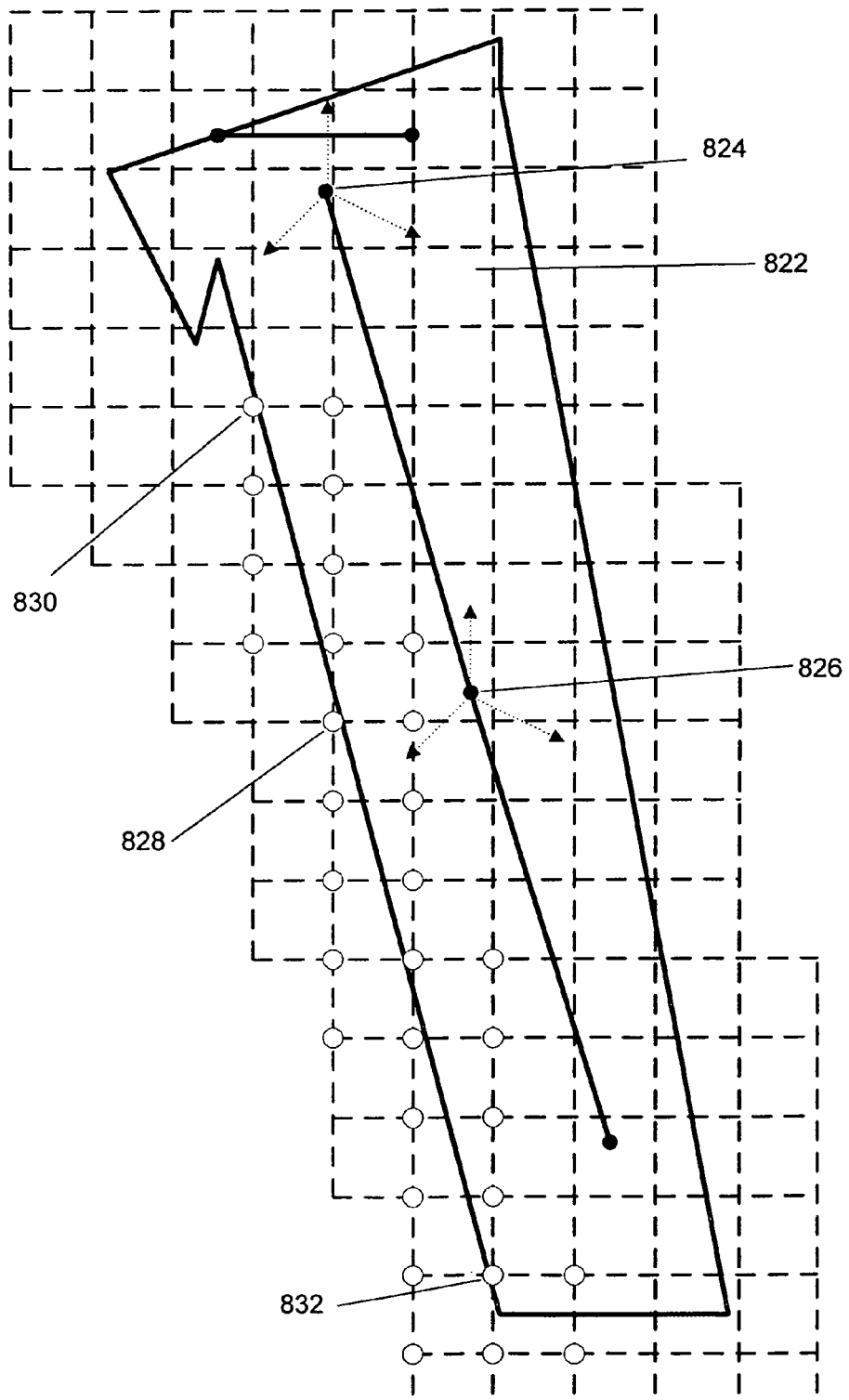

FIG. 8C illustrates an example of the set of frame weights determined for a portion of the sample points adjacent to the model skin. FIG. 8C shows a portion of a character model 822. Coordinate reference frames 824 and 826 are shown as well. A portion of the set of frame weights determined for the sample points adjacent to the model skin is highlighted with open circles in FIG. 8C. Each sample point has one or more frame weights. For example, sample point 828 may have a frame weight of 0.9 with respect to coordinate reference frame 826, and a frame weight of 0.1 with respect to coordinate reference frame 824. Sample point 830 may have a frame weight of 0.1 with respect to coordinate reference frame 826, and a frame weight of 0.9 with respect to coordinate reference frame 824. Sample point 832 may have a frame weight of 0.999 with respect to coordinate reference frame 826 and a frame weight of 0.001 with respect to coordinate reference frame 824.

At step 725, the set of reference frames and their associated frame weights are stored for use during the character animation phase. This completes step 415 and the character preparation phase. Following the completion of the character preparation phase, the character is ready to be used by an animator in the character animation phase. The character animation phase uses the set of basis functions, the associated set of skin modes, and the set of frame weights determined from method 400 to create a final posed character.

Figure 9:
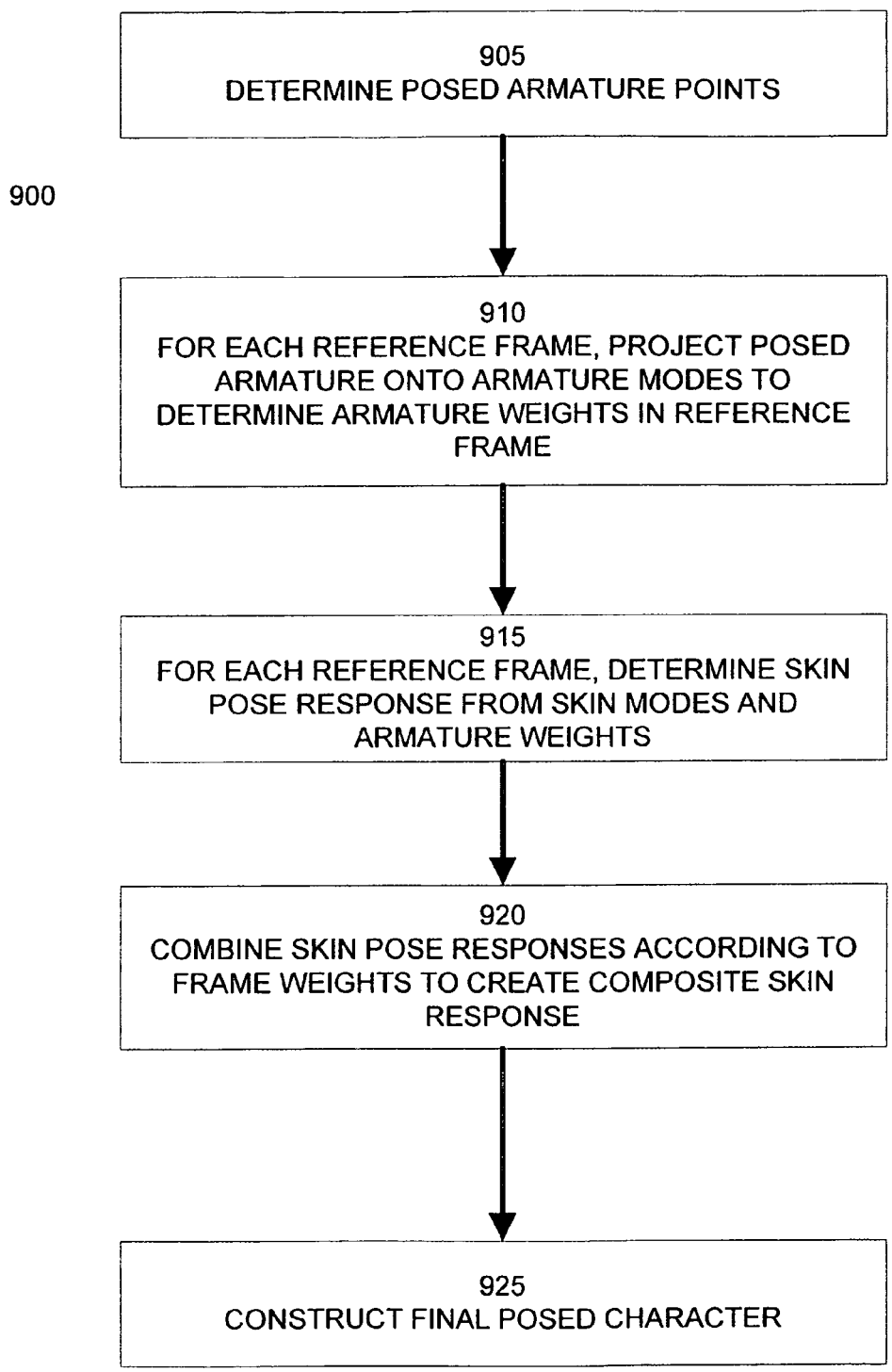
FIG. 9 illustrates a block diagram of a character animation phase for constructing a posed character model according to an embodiment of the invention.

FIG. 9 illustrates a block diagram of a method 900 for animating a character in the character animation phase for according to an embodiment of the invention. In step 905, a posed armature defines the bodily attitude of the desired final posed character. As discussed above, the posed armature can be created manually by an animator, by interpolating between key frames, or procedurally using one or more animations variables, functions, procedures, or algorithms. The posed armature is compared with the armature in the rest position to determine a pose vector defining the differences in positions and orientations between the armature segments in the posed and rest positions. Additionally, the set of coordinate reference frames attached to the armature follow their associated armature segments from the rest position to the posed position. A set of vectors defining the position and orientation of the set of coordinate reference frames are also determined in step 905.

At step 910, the pose vector is transformed into the each of the coordinate spaces defined by the set of coordinate reference frames in their posed positions. For each of the coordinate reference frames, the transformed pose vector is projected on to the armature basis functions. By projecting the pose vector on to the set of basis functions, the pose vector is transformed into a set of basis function weights. The basis function weights redefine the pose vector as a weighted sum of the set of basis functions. A set of basis function weights is created for each coordinate reference frame from the transformed pose vector.

At step 915, the set of basis function weights determined in step 910 are applied to the skin modes in each coordinate reference frame. As discussed above, a skin mode was previously created during the character preparation phase for each of the basis functions. In step 915, the basis function weights associated with each coordinate reference frame are applied to the skin mode of the basis function. The resulting set of skin modes, each weighted by its associated basis function weight, are summed to create a skin pose response. The skin pose response is the deformation of the character model in response to the posed armature. Provided the set of basis functions forms a complete basis of the pose space, a skin pose response can be determined for any possible character pose, regardless of whether the desired pose was explicitly part of the original pose set.

In step 915, a separate skin mode response is created for each of the coordinate reference frames. In an additional embodiment, step 920 skips the determination of a skin mode response in a reference frame for portions of the character skin where the frame weight is zero or negligible.

As discussed above, the skin response is represented in the form of modes that take the form of spatial shape offsets. During the character animation phase, portions of the model can be rotated away from their initial orientations. If the rotation is relatively large with respect to an adjacent portion of the character model, an undesirable shearing effect can be introduced. To correct for this shearing effect, separate skin pose responses are determined for each coordinate reference frame.

At step 920, the skin pose responses determined in each reference frame are combined to create a single composite skin pose response that does not include any shearing effects. In step 920, the set of skin pose responses are transformed from their associated coordinate reference frames to the global reference frame. Once all of the skin pose responses are in the same coordinate system, the skin poses are summed according to the set of frame weights previously determined in the character preparation phase. Each skin point is the weighted sum of the set of skin pose responses and the corresponding frame weights associated with the skin point. In an embodiment, these skin responses are summed in their basis-projected form. The result is a composite skin response.

Following step 920, the composite skin response is constructed from the basis-projected form back to physical form. In step 925, the weighted sum of the composite skin response and the set of basis functions creates the final posed character.

The steps of method 900 are repeated for each pose of a character to produce an animated sequence. Because the skin mode responses and the skin impulse responses are precomputed in the character preparation phase, the character animation phase can be performed in real-time or near real-time. This permits the animator to efficiently fine-tune the animation. Additionally, because the combined skin response of a character model realistically deforms in response to armature poses, the animator sees the final appearance of the character model during the animation process, rather than having to wait to see the final appearance of the animation.

Figure 10A:
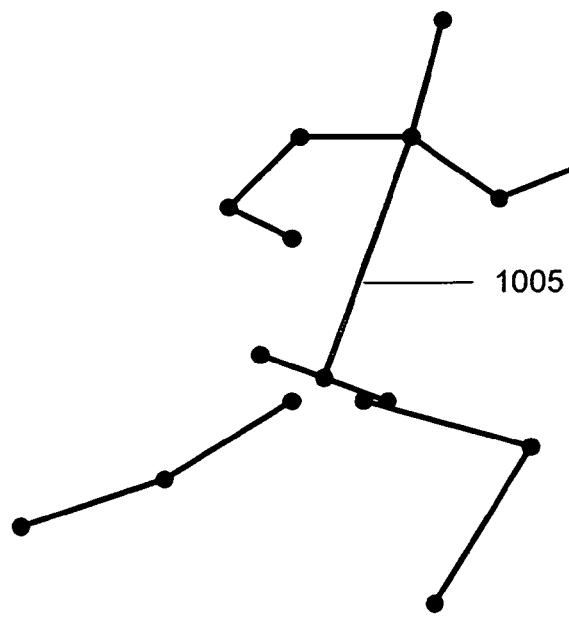
FIGS. 10A, 10B, 10C, and 10D illustrate the construction of a posed character model from an example armature and an example character model according to an embodiment of the invention.

FIGS. 10A, 10B, 10C, and 10D illustrate the construction of a posed character model from an example armature and an example character model according to an embodiment of the method described in FIG. 9. FIG. 10A illustrates an example posed armature 1005. In this example, posed armature 1005 defines the bodily attitude of a character in a running position. As discussed above, posed armature 1005 may be created manually by an animator, by interpolating between key frames, or procedurally using one or more animations variables, functions, procedures, or algorithms.

Figure 10B:
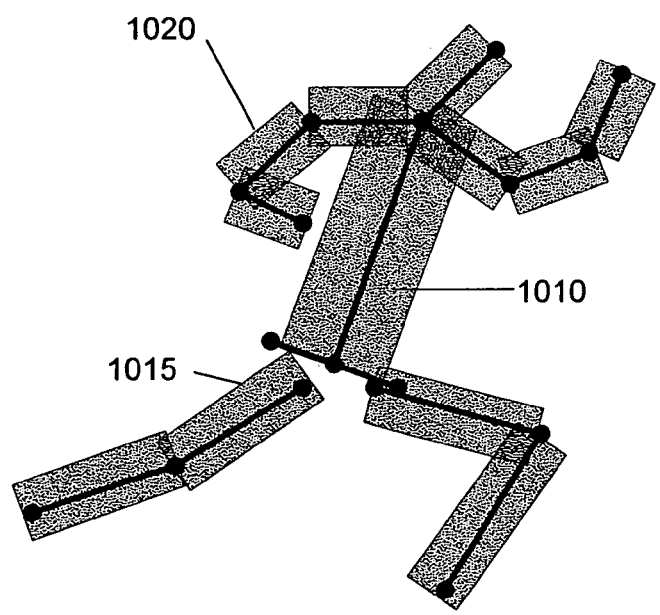

FIG. 10B illustrates the example posed armature 1010 and its associated set of coordinate reference frames. In FIG. 10B, each coordinate reference frame is represented by a shaded rectangle. The position and orientation of each rectangle illustrates the position and orientation of the associated coordinate reference frame in the posed position. The size of each rectangle illustrates the approximate portion of the character model influenced by the associated coordinate reference frame.

For example, coordinate reference frame 1015 is associated with the upper leg armature segment of the posed armature 1010. Coordinate reference frame 1015 influences the portion of the character model surrounding the upper leg armature segment. Similarly, coordinate reference frame 1020 influences the portion of the character model surrounding the upper arm armature segment of posed character 1010. Although not shown in FIG. 10B, two or more reference frames can influence the same portion of the character model.

Figure 10C:
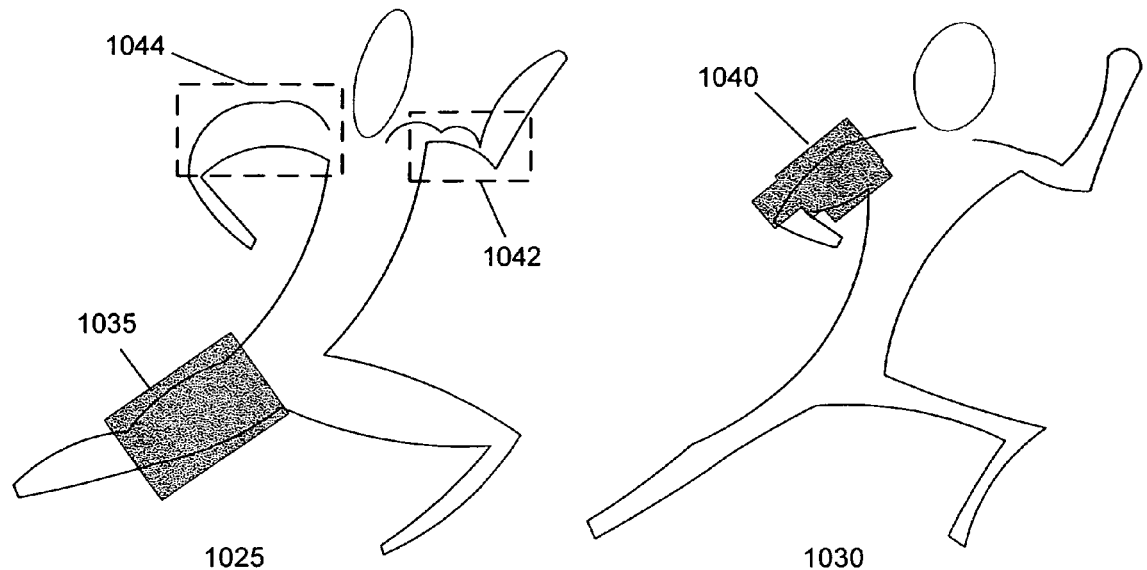

FIG. 10C illustrates examples of two of the skin pose responses determined for the coordinate reference frames. Skin pose response 1025 is associated with the coordinate reference frame 1035. Skin pose response 1030 is associated with coordinate reference frame 1040. As discussed above, but not shown in FIG. 10C, a skin pose response is determined for each of the coordinate reference frames associated with the posed armature.

Skin pose response 1025 shows the deformation of the character model in response to the posed armature from the view of coordinate reference frame 1035. The portion of the skin pose response 1025 within coordinate reference frame 1035 is correctly deformed in response to the posed armature. However, other portions of the skin pose response 1025 outside of coordinate reference frame 1035 are highly distorted due to shearing effects. For example, in skin pose response 1025, the upper leg portion of the character model within coordinate reference frame 1035 is correctly deformed from the posed armature, while the arms 1042 and 1044 of the character model are distorted due to shearing effects.

Similarly, the skin pose response 1030 shows the deformation of the character model in response to the posed armature from the view of coordinate reference frame 1040. The arm portion of the skin pose response 1030 within coordinate reference frame 1040 is correctly deformed in response to the posed armature. However, other portions of the skin pose response 1030 outside of coordinate reference frame 1040, such as the legs of the character model, are highly distorted due to shearing effects.

As discussed above with respect to the method of FIG. 9, the separate skin pose responses determined from each reference frame are combined using the set of frame weights into a composite skin pose response without shearing effects.

Figure 10D:
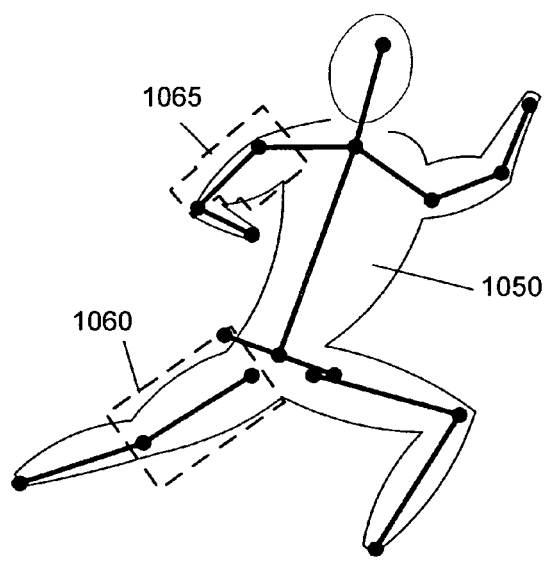

FIG. 10D illustrates the composite skin pose response 1050 created from a set of separate skin pose responses associated with different reference frames. For example, the leg portion 1060 of the composite skin pose response 1050 is created primarily from the skin pose response 1025 shown in FIG. 10C. Similarly, the arm portion 1065 of the composite skin pose response 1050 is created primarily from the skin pose response 1030. The set of frame weights determines the contribution of each skin pose response to a given portion of the composite skin pose response. As discussed above, because a skin point can be associated with several coordinate reference frames through a corresponding number of frame weight values, the composite skin pose response can include contributions from several skin pose responses.

Using the above-described embodiments, animators can create posed character models with a realistic bulging and bending in real-time. In a further embodiment of the invention, a character model or any other soft object is realistically deformed in response to collisions with other objects in real time. A character's skin can deform due to a collision with an external object, such as another character or a rigid object. A character's skin can also deform due to self-collision, which is the collision of one part of the character model with another part of the character. An example of self-collision can occur when a character's arm is bent at the elbow so that the upper and lower arm contact each other.

Creating realistic character model deformation in response to collisions is a two phase process, similar to that discussed in FIG. 3. The first phase is a collision preparation phase. The collision preparation phase is relatively computationally expensive and is performed in advance of any animation. The collision preparation phase creates a set of skin impulse responses defining the deformation of the character to a set of test collisions. Each character skin impulse response is the deformation of the surface of a character in response to a single collision at a single point. In an embodiment, the skin impulse response defines the displacement of points surrounding the collision point in response to a collision.

Following the completion of the collision preparation phase, in the collision animation phase animators create collisions by placing objects in contact with the character. In an embodiment of the invention, an animator defines the locations of the character model and the colliding object, referred to as a collider, in each frame of an animation sequence. Any portion of the character model overlapping or contacting the collider is considered to be part of the collision. For each frame, the collision animation phase determines the skin collision response, which is the deformation of the character model in response to the collision of the collider with the character model, using the set of skin impulse responses.

Regardless of the shape of the collider or the amount of collision between the character model and the collider, the collision animation phase uses the same set of skin impulse responses to determine the collision skin response. Thus, the collision preparation phase only needs to be performed once for a character model, and the collision animation phase is repeated to create a skin collision response for each frame in an animated sequence.

Figure 11:
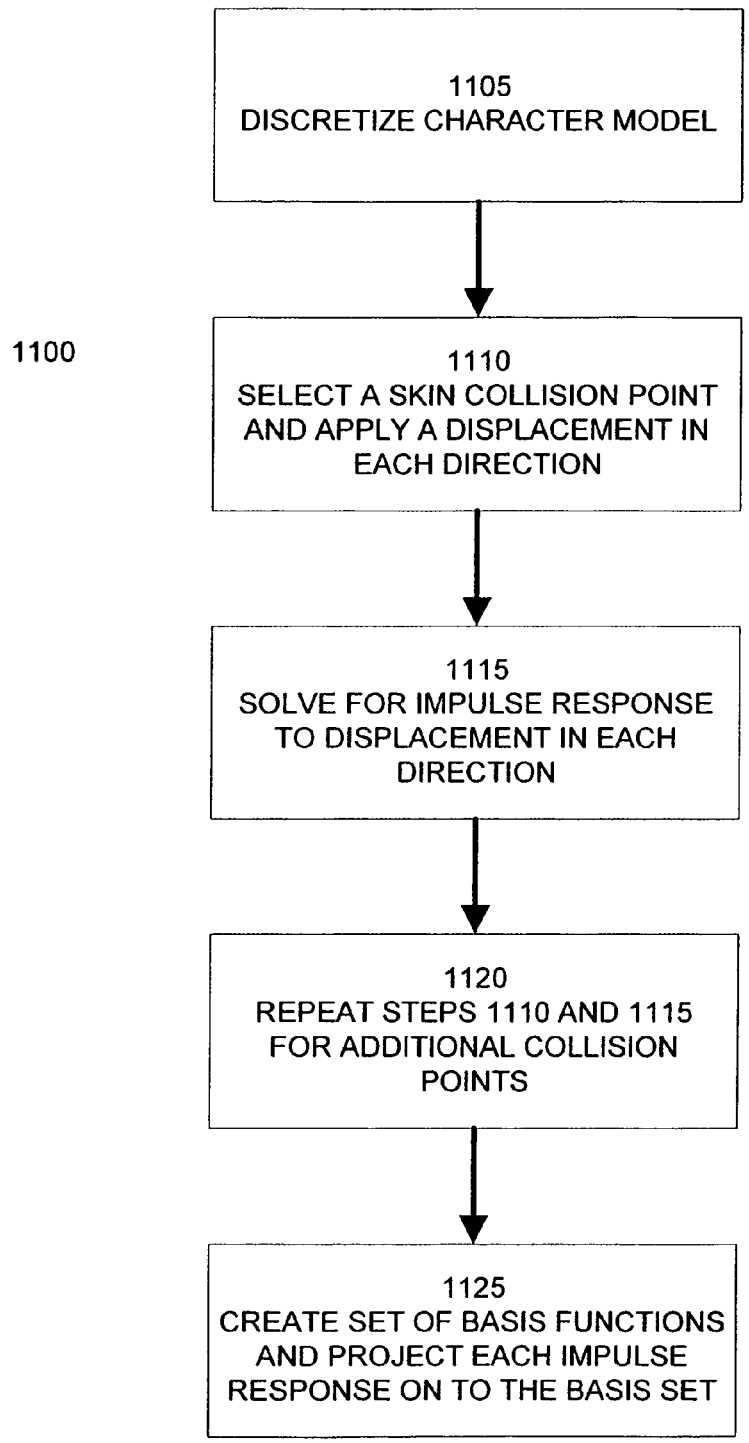
FIG. 11 illustrates a block diagram of a method for determining the skin impulse response of a character model according to an embodiment of the invention.

In the collision preparation phase, an embodiment of the invention determines a set of skin impulse responses for a character model. FIG. 11 illustrates a block diagram 1100 of a method for determining the skin impulse response of a character according to an embodiment of the invention. At step 1105, the character model is discretized to create a set of sample points. In an embodiment, the character model is discretized into a three-dimensional grid. In an alternate embodiment, the character model is discretized into a set of tetrahedral cells.

At step 1110, a collision point is selected. A collision point can be any point on the surface of the character model, or in a further embodiment, within the interior of a character model. As an example, internal collision points, which are collision points within a character model, can be used to deform the skin of a character model in response to collisions with internal "muscle" objects. However, skin and muscle are in reality often separated by a thin layer of fat. To approximate this anatomical feature, a "collision shield" can be created by selecting interior points of the character model as collision points.

Step 1110 applies a set of displacements to the collision point. Each displacement represents a collision of the character model at the collision point in a different direction. In an embodiment, a displacement is applied to the collision point in each of the three Cartesian directions. In a further embodiment, each displacement is a unit displacement in the appropriate direction. In a manner similar to that discussed in step 410, the sample points adjacent to the collision point are assigned displacement vectors based on the displacement at the collision point.

At step 1115, a skin impulse response is computed for each displacement using the displacement values assigned in step 1110 as initial input values. In an embodiment, the skin mode response is computed by determining the value of an elastic energy function over every sample point inside the character body, in a manner similar to that used to find the skin mode response. By minimizing the value of the elastic energy function over the entire discretized space, the value of $q_{xyz}$, the position offset, is calculated for each sample point. The skin impulse response for a given skin displacement is the set of position offsets at sample points adjacent to the skin of the model.

At step 1120, steps 1110 and 1115 are repeated for displacements applied to a number of collision points to create a set of skin impulse responses. In an embodiment where the skin includes one or more surfaces defined by control points, each control point is selected as a collision point and set of skin impulse responses are then created. In a further embodiment, control points for relatively rigid portions of the character model are excluded from the set of collision points.

At step 1125, a set of basis functions is determined from the set of skin impulse responses. In an embodiment, a single value decomposition is used to calculate the set of basis functions from the skin impulse responses. In alternate embodiments, other methods of calculating a set of basis functions, such as a canonical correlation, can also be used. In a further embodiment, if the resulting set of basis functions is not an orthonormal basis, the set of basis functions are orthonormalized so that each basis function has a magnitude of 1 and is perpendicular to every other basis function.

Step 1125 the projects the set of impulse responses onto the set of basis functions to create a compact representation of the set of skin impulse responses. In a further embodiment, less significant terms of the single value decomposition are truncated to decrease the number of basis functions. This results in a smoothing effect as the set of impulse responses are projected onto the truncated basis set. In an alternate embodiment, the set of skin responses are stored as a sparse set of vectors defining the displacement of surrounding points in response to a displacement of a collision point. This alternate embodiment represents skin impulse responses affecting only a small number of points more efficiently than the basis function representation.

Figure 12A:
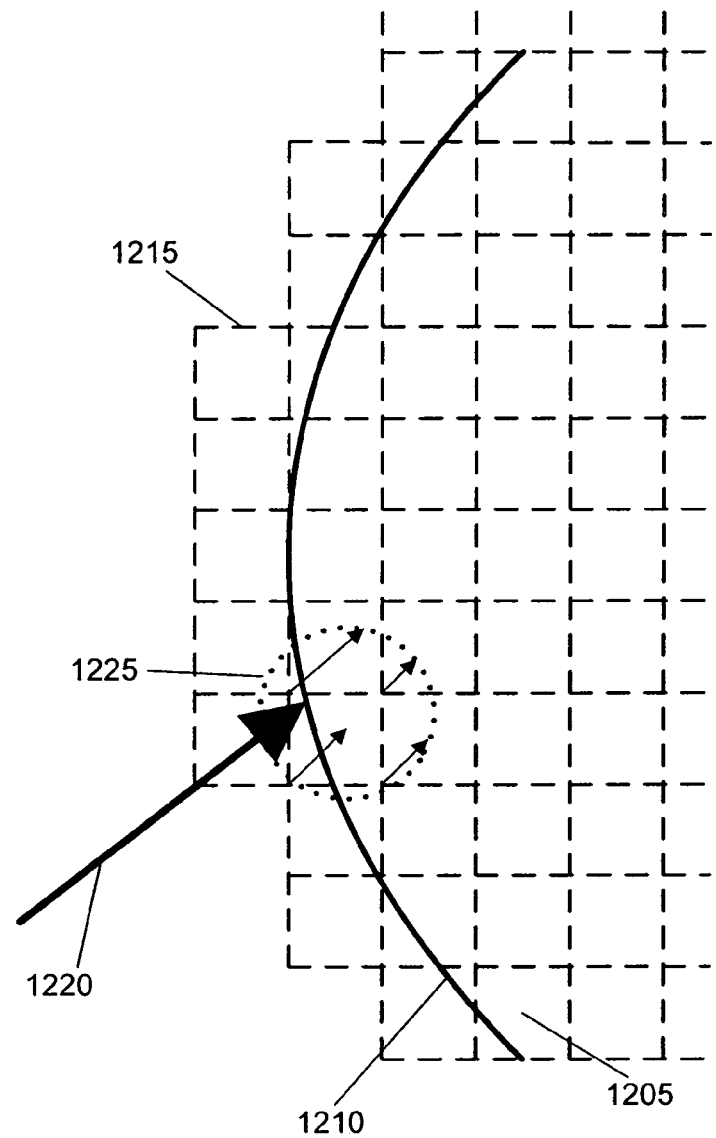
FIGS. 12A, 12B, and 12C illustrate the determination of a skin impulse response of a portion of an example character model according to an embodiment of the invention.
Figure 12B:
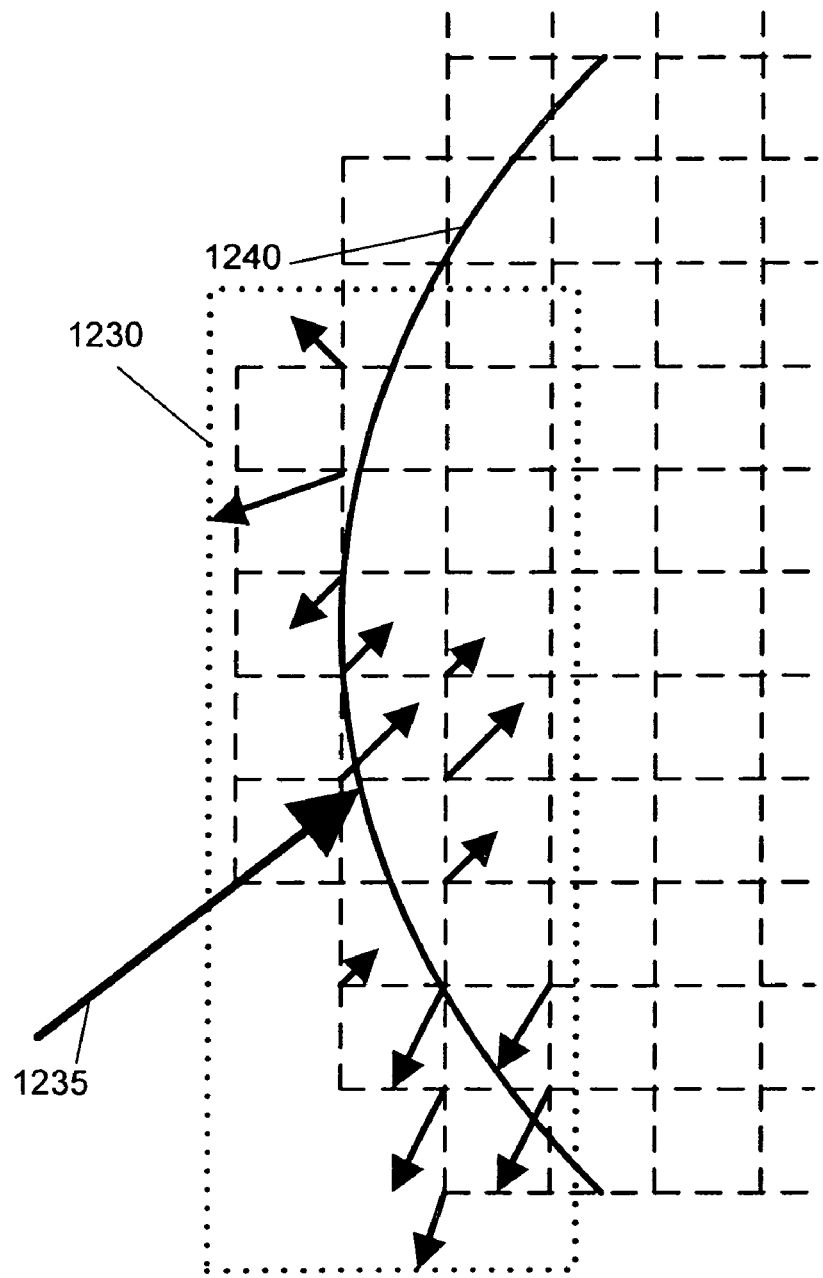
Figure 12C:
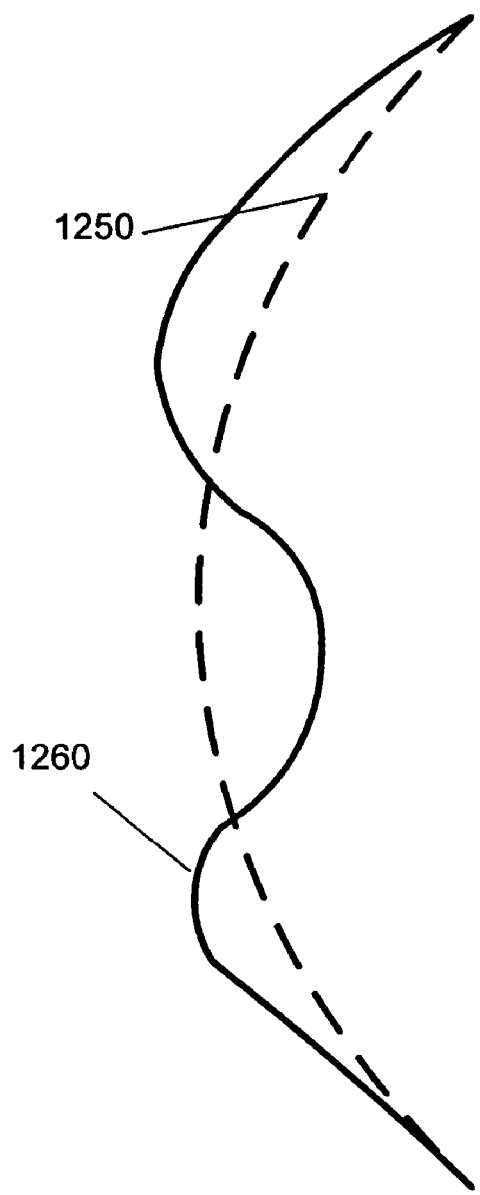

FIGS. 12A, 12B and 12C illustrate the determination of a skin impulse response of an example character according to an embodiment of the invention. FIG. 12A illustrates a displacement applied to a character model 1205. In this example, the character model 1205 has been discretized with a three-dimensional grid 1215. A displacement 1220 is applied to a collision point on the model skin 1210. A set of displacement values 1225 are assigned to the sample points adjacent to the collision point.

FIG. 12B illustrates a set of displacement vectors 1230 included as part of the skin impulse response resulting from the skin displacement 1235. The set of displacement vectors 1230 is provided for the purpose of explanation, and the skin impulse response may include any number of displacement vectors dispersed over all or a portion of the model skin. As can be seen from the magnitude and orientation of the set of grid displacement vectors 1230, the model skin bulges inward near the collision point and bulges outward in the region surrounding the collision point.

FIG. 12C illustrates the example skin impulse response of FIG. 12B projected onto the model skin. This figure is presented to clarify the effects of the skin impulse response of FIG. 12C on the appearance of the character model. As discussed above, an embodiment of the invention projects the skin impulse response on to a set of basis functions to create a more compact representation. In the example of FIG. 12C, the model skin 1260 bulges outward and inward as a result of the displacement created by the skin impulse response. In this example, the skin impulse response presents a realistic looking representation of the deformation of a character due to the collision with an object. The model skin 1250 in its rest state is shown for comparison.

Figure 13:
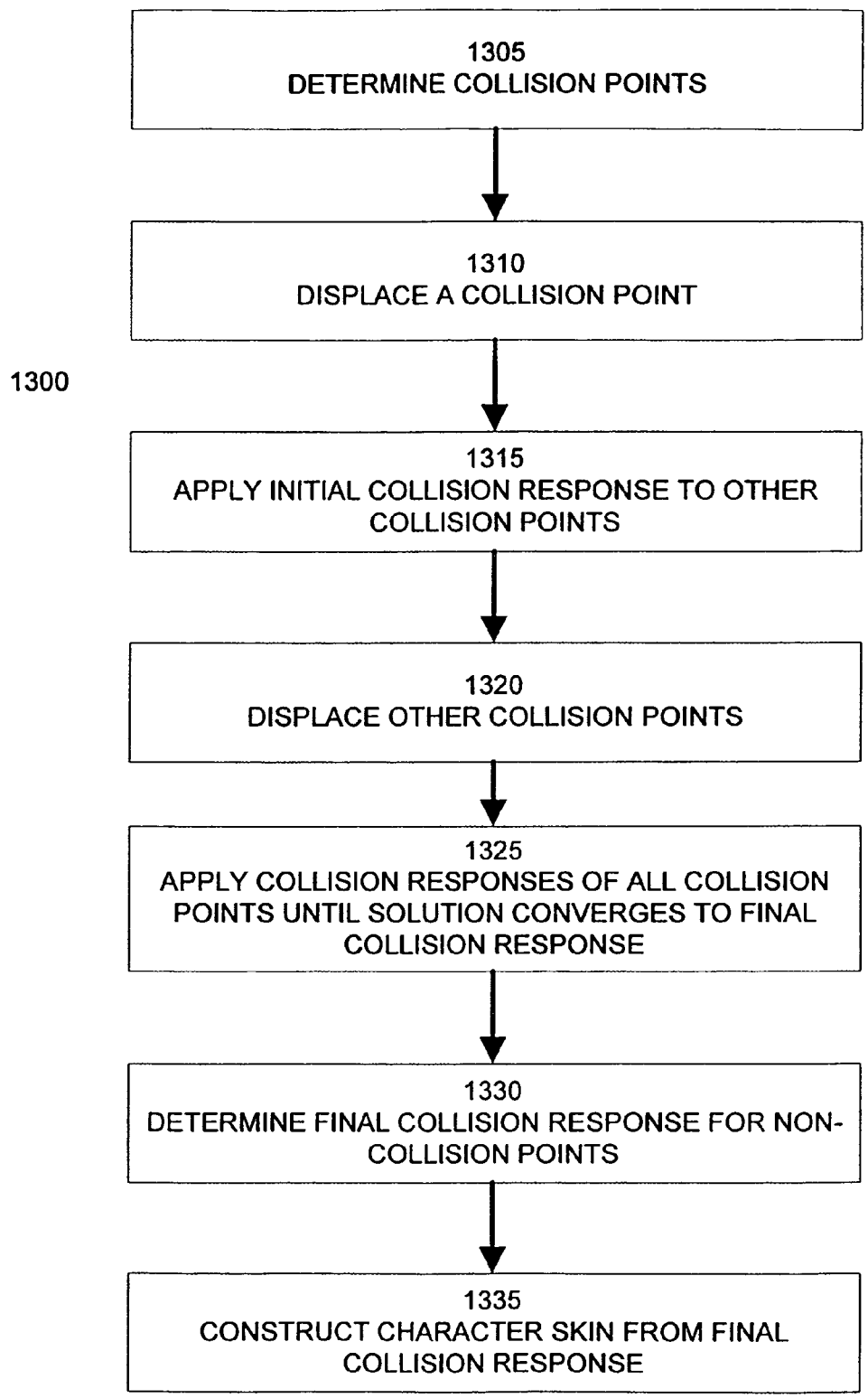
FIG. 13 illustrates a block diagram of a method for determining the collision response of a character model according to an embodiment of the invention.

Following the determination of the set of skin impulse responses in the collision preparation phase, the collision animation phase determines the deformation of the character skin in response to a collision defined by an animator. FIG. 13 illustrates a block diagram of a method 1300 for determining the collision response of a character model according to an embodiment of the invention. Method 1300 will be discussed below with reference to FIGS. 14A-14F, which illustrate the determination of a skin collision response from an example collision according to an embodiment of the invention.

Figure 14A:
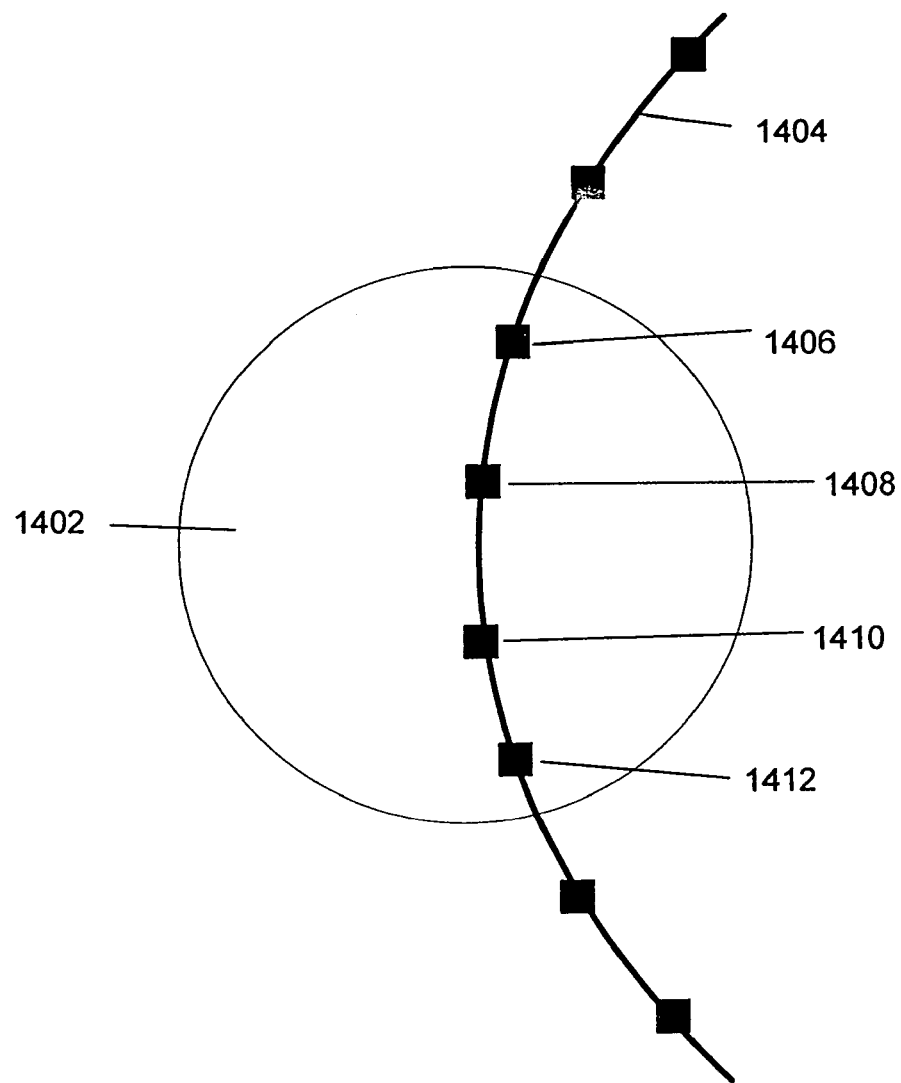
FIGS. 14A, 14B, 14C, 14D, 14E, and 14F illustrate the determination of the skin collision response of a portion of a character model according to an embodiment of the invention.

At step 1305, a set of collision points are identified. Collision points are skin points in contact with or inside of a collider. FIG. 14A illustrates a portion of a model skin 1404 in collision with a collider 1402. The model skin 1404 includes a number of skin points. A portion of these skin points are inside of collider 1402. These skin points, 1406, 1408, 1410, and 1412, are the set of collision points in this example collision. In a further embodiment, skin points that are not inside or in contact with a collider are selected as additional collision points if there are near the surface of the collider or near a collision point inside the collider. This provides a margin of safety when the deformation of the character skin from a collision causes additional skin points to contact the collider.

At step 1310, a first collision point is selected and displaced to a potential rest position, which is a first approximation of the final rest position of a collision point. In an embodiment, the first collision point is selected randomly. In one embodiment, the potential rest position is the position on the surface of the collider nearest to the first collision point. In an alternate embodiment, the potential rest position is a position between the first collision point and the nearest collider surface point. In a further embodiment, a scaling factor is used to determine the distance between the nearest collider surface point and the potential rest position.

Figure 14B:
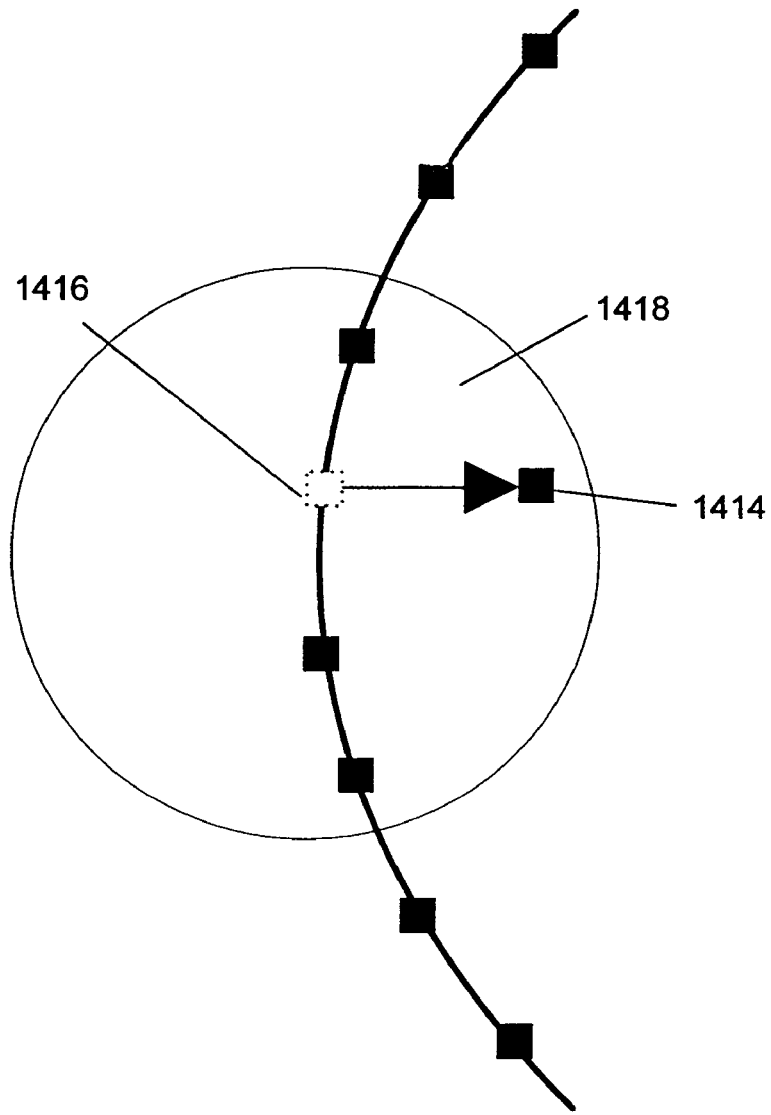

FIG. 14B illustrates an example first collision point 1414 displaced from its initial position 1416 to a potential rest position. In this example, the potential rest position is 80% of the distance between the its initial position 1416 and the nearest surface point of the collider 1418. In this example, the scaling factor is selected to optimize the performance of method 1300. Although first collision point 1414 is shown being displaced in a strictly horizontal direction for clarity, it should be noted that a collision point can be moved in any direction to a potential rest position.

At step 1315, an initial collision response is applied to the other, non-displaced collision points. The initial collision response is determined by projecting the displacement of the first collision point from its initial position to the potential rest position on to the set of basis functions previously created from the set of impulse responses. The projection of the displacement on the set of basis functions creates a set of weights defining the displacement in basis space.

The set of weights are then applied to the impulse responses associated with the first collision point. This results in an initial collision response for the first collision point. The initial collision response defines the displacement of skin points surrounding the first collision point in response to the displacement of the first collision point from its initial position to the potential rest position.

The initial collision response is applied to the surrounding collision points to displace these collision points from there initial position. It should be noted that the initial collision response is applied only to the collision points, i.e. only point in contact with or within the collider, even though the skin impulse responses associated with a first collision point can define displacements for additional points.

Figure 14C:
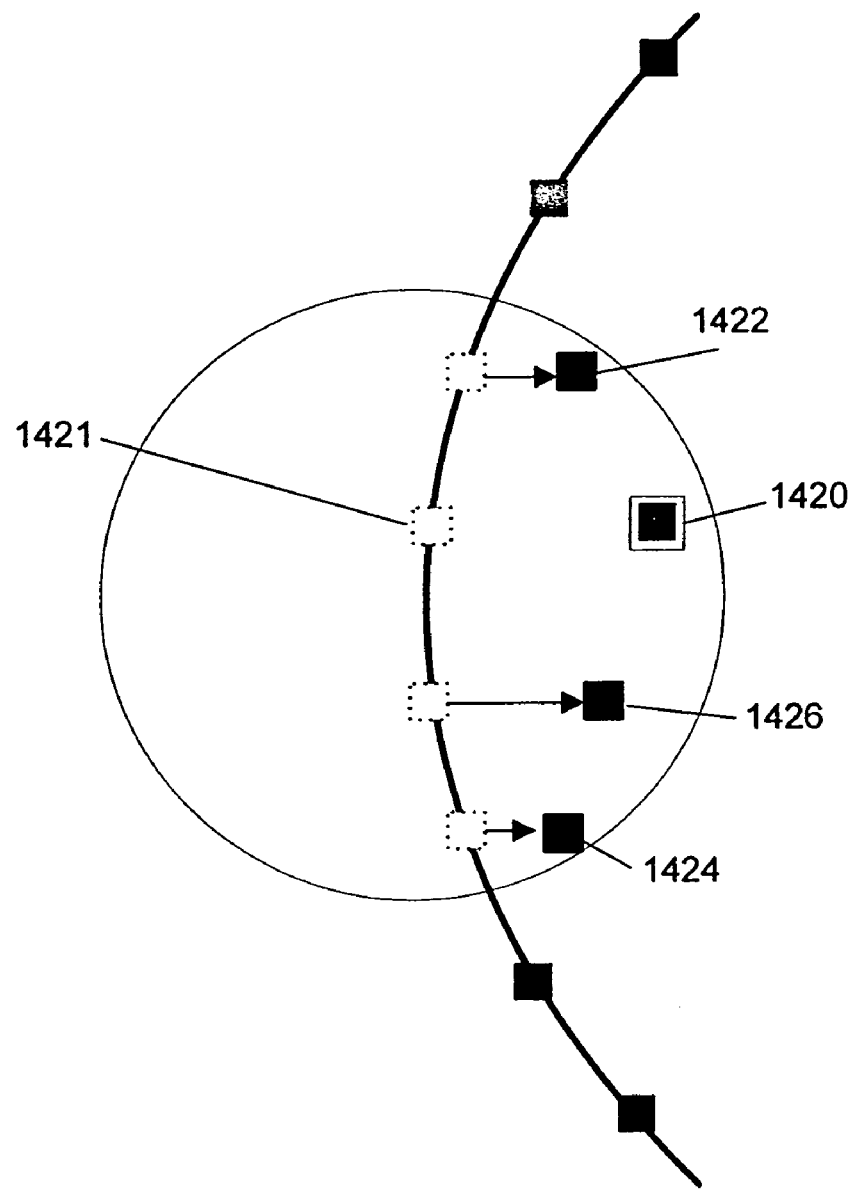

FIG. 14C illustrates the application of an example initial collision response to a set of surrounding collision points. In this example, the first collision point 1420, outlined for emphasis, has been displaced from its initial position 1421 to a potential rest position, resulting in the application of an initial collision response to the set of surrounding collision points. The initial collision response is the displacement applied to the surrounding collision points 1422, 1424, and 1426 resulting from the displacement of first collision point 1420. The initial collision response displaces collision points 1422, 1424, and 1426 from their respective initial positions to new potential rest positions as shown. As discussed above, the skin points outside of the collider, i.e. the non-collision skin points, are not displaced at this point of the collision animation phase.

At step 1320, the set of surrounding collision points are further displaced to respective potential rest positions. Similar to step 1310, each of the surrounding collision points is moved from the position set at step 1315 to a potential rest position. In one embodiment, the positions on the surface of the collider nearest to each of the surrounding collision points are the respective potential rest positions. In an alternate embodiment, potential rest position is a position between a collision point and the nearest collider surface point. In a further embodiment, a scaling factor is used to determine the distance between the nearest collider surface point and the potential rest position. In one example, the potential rest position of a surrounding collision point is 80% of the distance between the surrounding collision points new position, determined in step 1315 and the nearest surface point of the collider.

Following the displacement of the surrounding collision points to their respective potential rest positions, at step 1325 a set of collision responses are determined for the set of surrounding collision responses. Similar to set 1315, the displacement of each of the surrounding collision points from its initial position to its respective potential rest position is projected on to the set of basis functions previously created from the set of impulse responses. Each displacement projection creates a set of basis weights associated with one of the surrounding collision points.

The basis weights of a surrounding collision point are applied to the corresponding impulse responses associated with the surrounding collision point to create a secondary collision response. This is repeated for each of the surrounding collision points to create a set of secondary collision responses. Each secondary collision response defines the displacement of skin points near the surrounding collision point in response to the displacement of the surrounding collision point from its initial position to its respective potential rest position.

The set of secondary collision responses are applied to all of the collision points, including the first collision point selected in step 1310, to displace these collision points from their potential rest positions. Once again, the secondary collision responses are only applied to collision points and non-collision points are not moved during this step of the collision animation phase.

Following the application of the secondary collision responses to the set of collision points, each of the set of collision points will have new positions. Step 1325 determines a displacement for each of the collision points from their initial positions, and creates a new set of collision responses in a similar manner to that discussed above. The new set of collision responses is applied to further displace the set of collision points. This process of creating a set of collision responses and applying the set of collision responses to the set of collision points is repeated until the set of collision points converge on a final set of displacements.

Figure 14D:
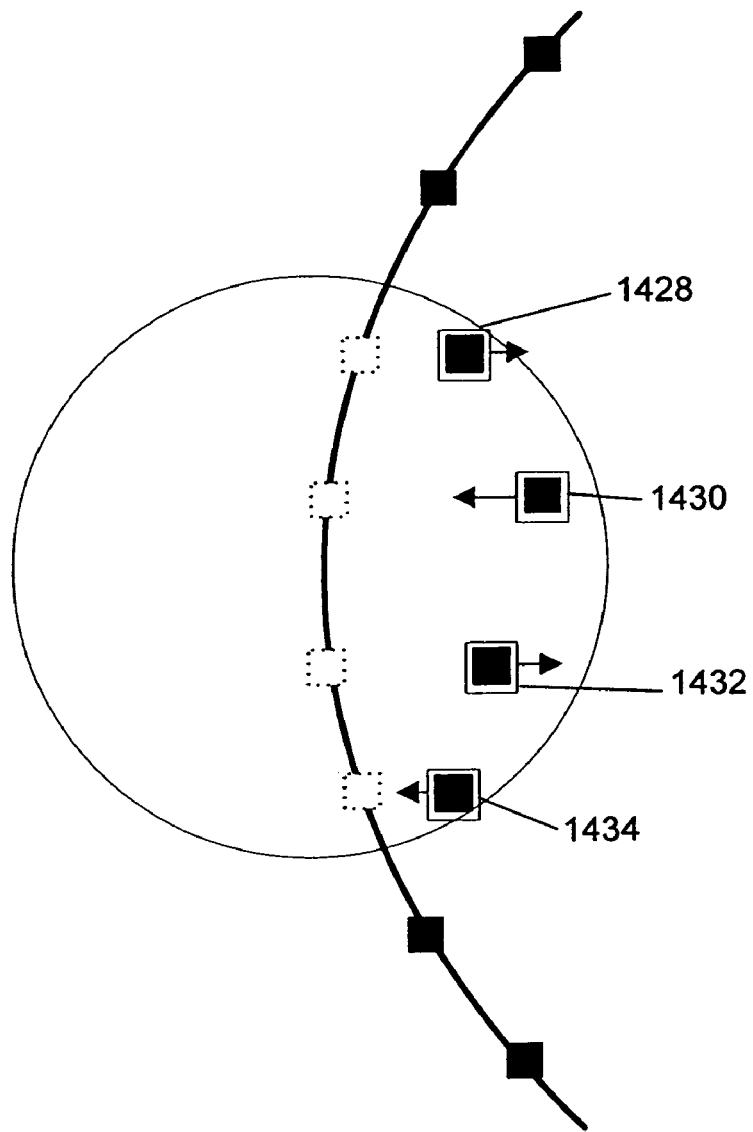

FIG. 14D illustrates the application of a set of secondary collision responses to the set of collision points. A set of collision points, 1428, 1430, 1432, and 1434, have vectors indicating a displacement from their potential rest positions as a result of the set of secondary collision responses. Each vector represents the sum of the displacements resulting from the secondary collision responses of the other collision points. For example, the displacement of collision point 1428 is the sum of the secondary collision responses from collision points 1430, 1432, and 1434.

At step 1330, the final collision response is applied to the non-collision points. The final set of displacements determined in step 1325 is the displacement of each collision point from its initial position to its final position. Step 1330 projects each displacement from the final set of displacements on the set of basis functions to create a basis weight associated with each collision point. Each collision point's basis weight is applied to its associated impulse responses to determine a set of displacements for the non-collision points. The displacements resulting from each collision point are added together to create a final collision response defining the displacement of the non-collision points in response to the collision.

Figure 14E:
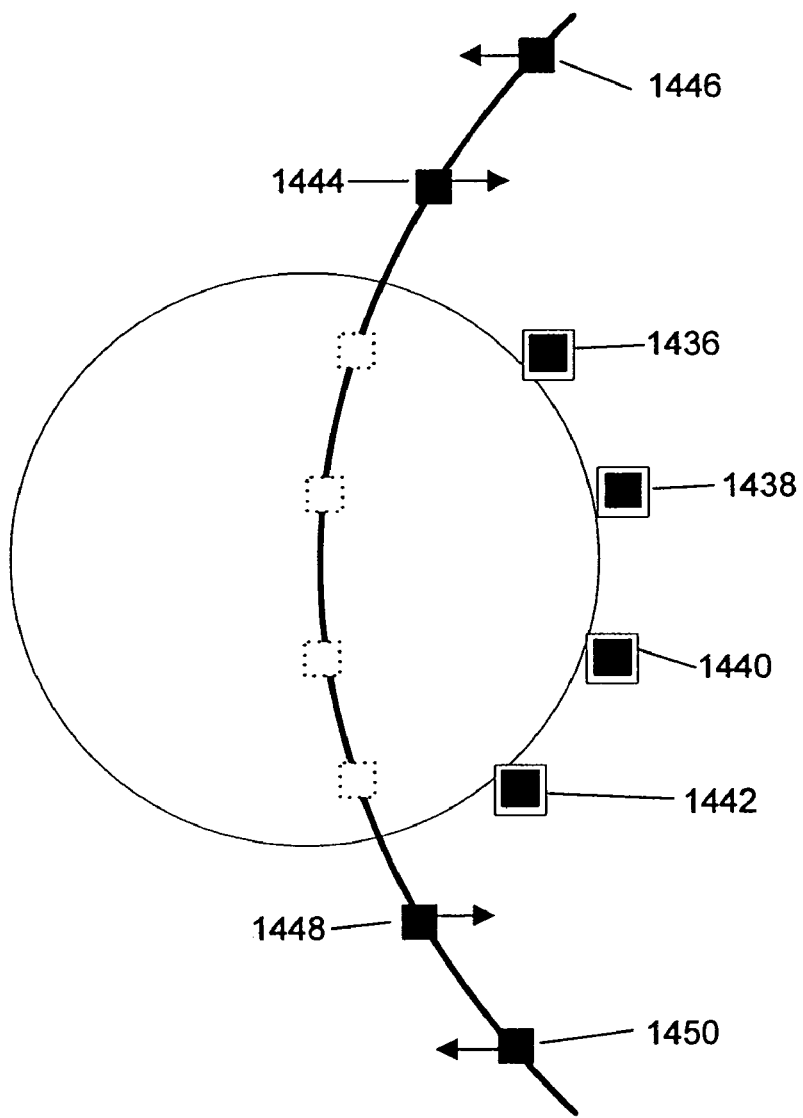

FIG. 14E illustrates the determination of the final collision response for the non-collision points. Collision points 1436, 1438, 1440, and 1442, outlined for emphasis, have been displaced from their initial positions, shown in dotted outline, to their final positions. Based on the displacements of the set of collision points, the non-collision points 1444, 1446, 1448, and 1450 are displaced from their initial positions as indicated by their respective vectors. Each vector represents the sum of the displacements contributed from the set of collision points 1436, 1438, 1440, and 1442.

In an embodiment of the invention, all of the collision responses are determined and summed together in basis space. This improves the efficiency of the method 1300. In this embodiment, at step 1335, the final collision response is constructed from the basis-projected form back to physical form. The skin deformation from the collision is determined from the weighted sum of the final collision response and the set of basis functions.

In an alternate embodiment, sparse vectors representing the impulse response of collisions points are used to determine the final collision response. In another embodiment, the association between a collider and collision points can be determined from their positions in the rest pose. This embodiment is useful in cases where the skin response is not expected to move much in response to a collision, for example, the collision between skin (or an internal collision shield) and muscles.

Figure 14F:
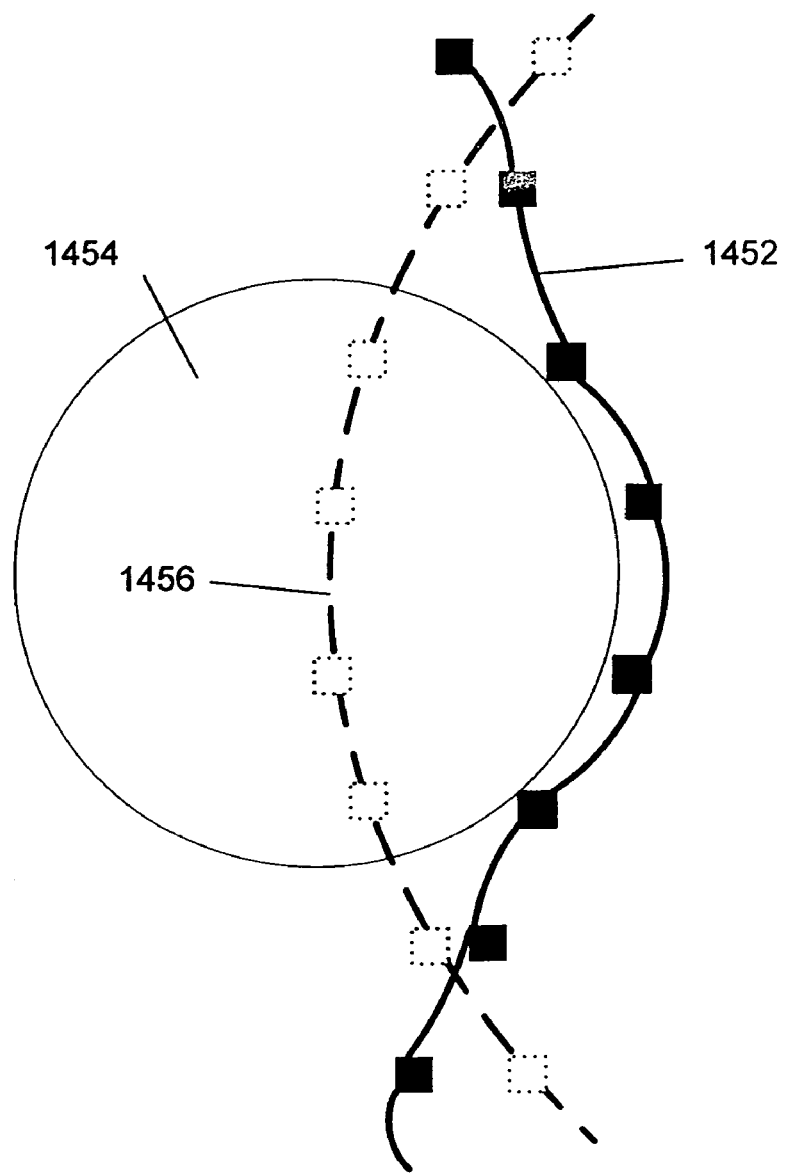

FIG. 14F illustrates the final collision response constructed onto the model skin. In the example of FIG. 14F, the skin 1452 bulges inward and around the collider 1454 as a result of the final collision response, presenting a realistic looking deformation in response to a collision. For comparison, an outline 1456 of a initial undeformed character surface is also shown.

As discussed above, during the collision animation phase, only the collision points are displaced until the final collision response is determined. This greatly limits the number of points need to be calculated in determining the collision response and allows the collision animation phase to be performed in real-time. This give the animator the ability to fine-tune the interaction of characters with their surroundings.

In a further embodiment of the invention, the methods of deforming a character model in response to a posed armature and in response to a collision can be combined. In this combined embodiment, character models deform realistically in response to a posed armature and to collisions. In this embodiment, the animation process is divided into two phases: a combined preparation phase and a combined animation phase. Similar to the other embodiments, in this embodiment, the combined preparation phase is performed once for a character model. In the combined preparation phase, an armature basis set, a corresponding set of skin modes, and a set of frame weights are determined as described in method 400. Additionally, the combined preparation phase determines a set of skin impulse responses and an associated impulse basis set as described in method 1100.

Figure 15:
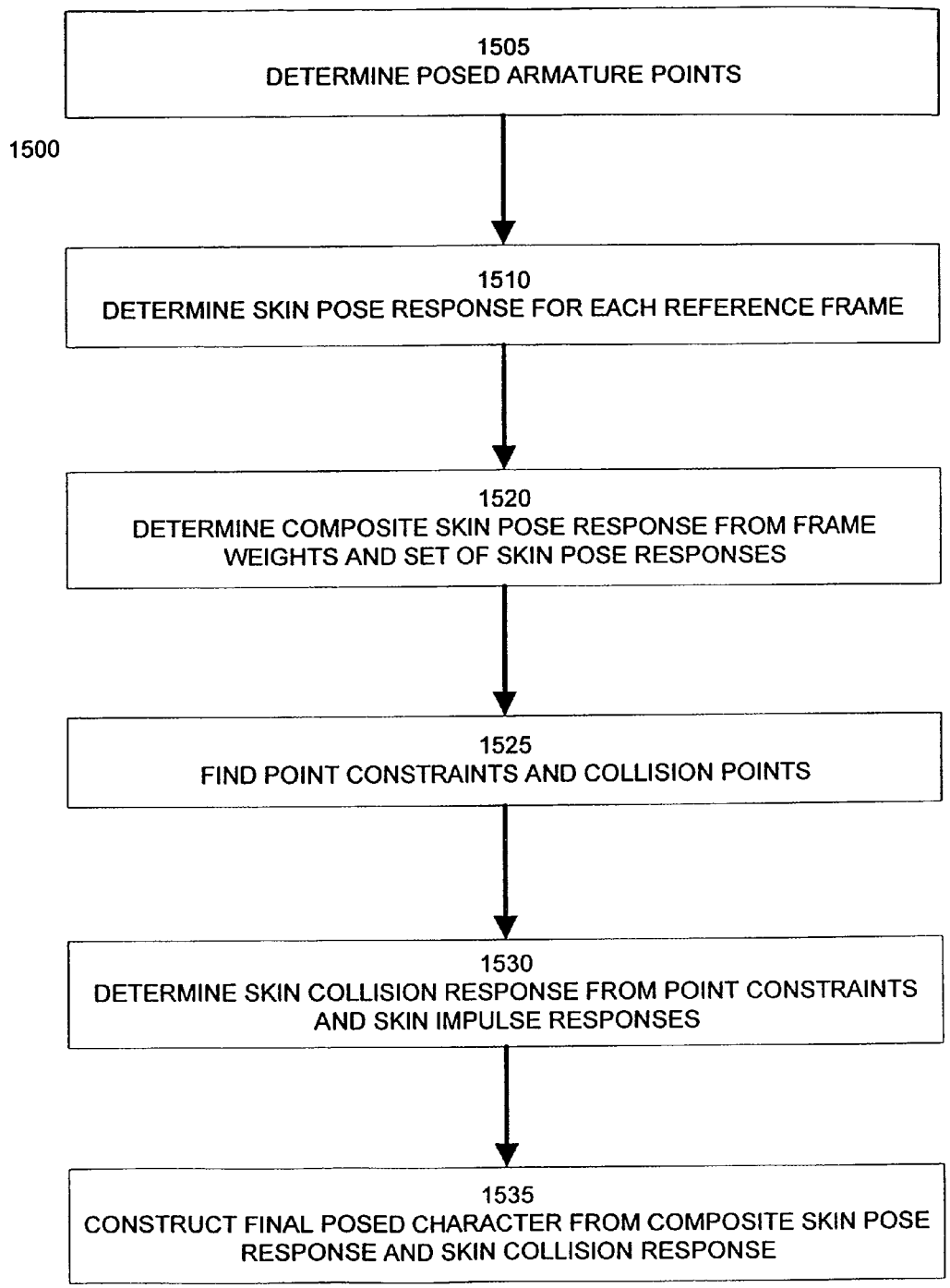
FIG. 15 illustrates a block diagram of a character animation phase for constructing a posed character model according to a further embodiment of the invention.

The combined animation phase uses the armature basis set, the set of skin modes, the set of frame weights, the set of skin impulse responses, and the impulse basis set to create a character model posed and deformed according to the specifications from an animator. FIG. 15 illustrates a block diagram of a method 1500 for animating a character in the combined animation phase for according to an embodiment of the invention. In step 1505, a posed armature defines the bodily attitude of the desired final posed character. As discussed above, the posed armature can be created manually by an animator, by interpolating between key frames, or procedurally using one or more animations variables, functions, procedures, or algorithms. Additionally, as the set of coordinate reference frames attached to the armature follow their associated armature segments from the rest position to the posed position, a set of vectors defining the position and orientation of the set of coordinate reference frames are also determined in step 1505.

At step 1510, a set of skin poses responses are determined for the set of coordinate reference frames. Each skin pose response is determined in a similar manner to that described in method 900. Generally, the pose vector and the set of basis functions are transformed into the coordinate spaces defined by a coordinate reference frame in its posed positions. The transformed pose vector is projected on to the transformed set of armature basis functions to create a set of basis function weights. The set of basis function weights are applied to the skin modes in each coordinate reference frame to determine a skin pose response for the coordinate reference frame. This is repeated for each coordinate reference frame to create a set of skin pose responses.

At step 1515, a composite skin pose response is determined from the set of skin pose responses. Similar to the method 900 discussed above, the skin pose responses from each coordinate reference frame are combined according to the associated frame weights to correct for undesirable shearing effects. Generally, the set of skin pose responses are transformed from their associated coordinate reference frames to the global reference frame and summed according to the set of frame weights. The results of this step is a composite skin response.

At step 1520, point constraints are identified. Point constraints are the points displaced from collisions of the character model with itself or external objects. Animators can create collisions by positioning objects in contact with the character model in each frame, either manually or as the result of motion defined by a set of key frames or one or more animations variables. Point constraints can also result from the animator attaching a point of the character model to another object, or by manually forcing a skin point into a new position. In an embodiment, step 1520 identifies potential collision points by defining a radius around each point on the skin of the character model. In an alternate embodiment, a bounding box is used to identify potential collision points. Step 1520 identifies the set of collision points to be used to determine the deformation of the character model from a collision.

At step 1525, the set of collision points are evaluated to determine the skin collision response. An embodiment of step 1525 evaluates the set of collision points according to the method 1300 discussed above. Generally, a first displacement is determined for a first collision point. The first displacement is projected on to the set of impulse basis functions to determine an initial collision response from skin impulse responses. The initial collision response displaces the surrounding collision points. The displacements of the surrounding collision points are applied to their respective skin impulse responses to further displace the set of collision points. The further displacement of the set of collision points creates subsequent collision responses, which are iteratively processed until the collision points converge to their final positions. The final positions of the set of collision points define a skin collision response, which is then applied to the set of non-collision points.

At step 1530, character model is constructed from the composite skin pose response and the skin collision response. In an embodiment, both the composite skin pose response and the skin collision response are stored and processed in their basis projected forms. In this embodiment, the weighted sum of the composite skin responses and the set of armature basis functions is added to the weighted sum of the skin collision response and the set of impulse basis functions. The result is a character model deformed in response to the armature pose and collisions.

The steps of method 1500 are repeated for each frame to produce an animated sequence. Because the skin mode responses and the skin impulse responses are precomputed in the combined preparation phase, the combined animation phase can be performed in real-time or near real-time. This permits the animator to efficiently fine-tune the animation and maximize the dramatic impact of the animation. Additionally, because the combined skin response of a character model realistically deforms in response to armature poses and collisions, the animator sees the final appearance of the character model during the animation process, rather than having to wait to see the final appearance of the animation.

Furthermore, the present invention determines a realistic character deformation directly from the posed armature without the need to create underlying bone and muscle structures required by physical simulation techniques or complicated armature weightings used by kinematic transform techniques. This decreases the time and effort needed to create character models compared with prior animation techniques.

It should be noted that once the posed or deformed model has been created using one or more of the above discussed embodiments, any rendering technique, for example ray-tracing or scanline rendering, can create a final image or frame from the model in combination with lighting, shading, texture mapping, and any other image processing information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is clamed is

1. A method for creating a posed character model, the method comprising:
    receiving a set of sample armature poses, wherein the set of sample armature poses defines a range of potential character model poses;
    determining a set of armature reference poses from the set of sample armature poses, wherein each armature reference pose includes armature reference positions and wherein the set of armature reference poses is smaller than the set of sample armature poses;

for each armature reference pose, determining a simulated character model shape mode in response to the set of armature positions of the corresponding armature reference pose;

storing the simulated character model shape modes in association with their respective armature reference poses;

determining a mapping of armature target positions representing an armature target pose on to the set of armature reference positions corresponding with the set of armature reference poses, such that the application of the mapping to the set of armature reference positions at least approximates the armature target positions;

applying the mapping to the simulated character model shape modes corresponding with the armature reference poses to determine target character model shape modes; and combining the target character model shape modes using a processor to determine a posed character model corresponding with the armature target pose;

wherein determining the mapping comprises:

determining a first mapping of the armature target positions on to the set of armature reference positions transformed to a first reference frame associated with a first portion of the character model; and determining a second mapping of the armature target positions on to the set of armature reference positions transformed to a second reference frame associated with a second portion of the character model;

wherein applying the mapping to the simulated character model shape modes comprises:

applying the first mapping to the simulated character model shape modes in the first reference frame to determine first target character model shape modes in the first reference frame; and applying the second mapping to the simulated character model shape modes in the second reference frame to determine second target character model shape modes in the second reference frame; and wherein combining the target character model shape modes comprises combining the first target character model shape modes and the second target character model shape modes according to contributions of the first and second reference frames to the character model.

2. The method of claim 1, the method comprising:
receiving first contributions of the first and second reference frames, wherein the first contributions are associated with a first portion of the character model; and
applying a spatial diffusion function to the first contributions of the first and second reference frames to determine second contributions of the first and second reference frames, wherein the second contributions are associated with a second portion of the character model;
wherein the contributions of the first and second reference frames to the character model include at least the first and second contributions.

3. The method of claim 1, the method comprising:
comparing the simulated character model shape modes with a corresponding set of non-linear solutions to determine the contributions of the first and second reference frames to the character model.

4. The method of claim 1, the method comprising:
setting at least a portion of the contributions of the first and second reference frames to the character model to values received from a user.

5. The method of claim 1, wherein determining the simulated character model shape mode in response to the set of armature positions of the corresponding armature reference pose comprises:
determining displacements of the set of armature positions of the corresponding armature reference pose from rest armature positions defining a rest pose of the character model;
assigning the displacements to a first portion of the character model;
determining a system of displacement functions associated with the first portion and at least a second portion of the character model;
minimizing the system of displacement functions to determine minimized displacements; and
determining the simulated character model shape mode from a portion of the minimized displacements.

6. The method of claim 5, wherein the system of displacement functions includes a material energy function.

7. The method of claim 1, wherein determining a set of armature reference poses from the set of sample armature poses comprises:
determining the set of armature reference poses from the set of sample armature poses using a singular value decomposition.

8. The method of claim 1, wherein determining a set of armature reference poses from the set of sample armature poses comprises:
determining the set of armature reference poses from the set of sample armature poses using canonical correlation.

9. The method of claim 1, wherein the sample armature poses include a procedurally-created pose.

10. The method of claim 1, comprising:
rendering at least a portion of an image including at least a portion of the posed character model.

11. A method for creating a posed character model, the method comprising:
receiving a character model having a rest pose shape;
receiving an armature including a set of armature rest positions for the character model in the rest pose shape;
for each of a plurality of sets of armature reference positions, determining a set of armature position offsets between the set of armature reference positions and the set of armature rest positions;
for each of the sets of armature position offsets, generating a reference shape mode of the character model based on a simulated response of the character model in the rest pose shape to the set of armature position offsets;
generating a statistical model correlating the sets of armature position offsets with the reference shape modes;
storing the statistical model; and
determining a target character model shape using a processor by applying the statistical model to armature target position offsets representing an armature target pose;
wherein determining the target character model shape comprises:
performing a first application of the statistical model to the armature target position offsets transformed to a first reference frame associated with a first portion of the character model, wherein the first application of the statistical model determines first target character model shape modes in the first reference frame;
performing a second application of the statistical model to the armature target position offsets transformed to a second reference frame associated with a second portion of the character model, wherein the second application of the statistical model determines second target character model shape modes in the second reference frame; and combining the first target character model shape modes and the second target character model shape modes according to contributions of the first and second reference frames to the character model.

12. The method of claim 11, the method comprising:

receiving first contributions of the first and second reference frames, wherein the first contributions are associated with a first portion of the character model; and applying a spatial diffusion function to the first contributions of the first and second reference frames to determine second contributions of the first and second reference frames, wherein the second contributions are associated with a second portion of the character model;

wherein the contributions of the first and second reference frames to the character model include at least the first and second contributions.

13. The method of claim 11, the method comprising:

comparing the reference shape modes with a corresponding set of non-linear solutions to determine the contributions of the first and second reference frames to the character model.

14. The method of claim 11, the method comprising:

setting at least a portion of the contributions of the first and second reference frames to the character model to values received from a user.

15. The method of claim 11, wherein generating a reference shape mode of the character model comprises:

assigning the armature position offsets to a first portion of the character model;

determining a system of displacement functions associated with the first portion and at least a second portion of the character model;

minimizing the system of displacement functions to determine minimized offsets; and determining the reference shape mode from a portion of the minimized offsets.

16. The method of claim 15, wherein the system of displacement functions includes a material energy function.

17. The method of claim 11, comprising:

determining the plurality of sets of armature reference positions from a set of sample armature poses, wherein the number of sets of armature reference positions is less than the number of sample armature poses.

18. The method of claim 17, wherein determining the plurality of sets of armature reference positions comprises:

determining a set of armature reference poses from the set of sample armature poses using a singular value decomposition; and for each of the set of armature reference poses, determining a set of armature reference positions.

19. The method of claim 17, wherein determining the plurality of sets of armature reference positions comprises:

determining a set of armature reference poses from the set of sample armature poses using canonical correlation; and for each of the set of armature reference poses, determining a set of armature reference positions.

20. The method of claim 17, wherein the sample armature poses include a procedurally-created pose.

21. The method of claim 11, comprising:

rendering at least a portion of an image including at least a portion of the character model in the target character model shape.

22. A method for creating a posed character model, the method comprising:

receiving a character model having a rest pose shape;

receiving an armature in a rest post corresponding with the character model in the rest pose shape;

receiving a set of sample armature poses;

generating a set of canonical armature reference poses adapted to define a range of potential armature poses including at least approximations of the set of sample armature poses, wherein the set of canonical armature reference poses is smaller than the set of sample armature poses;

generating reference skin position offsets for each of the set of canonical armature reference poses;

determining a decomposition of a target armature pose into target armature pose components comprising at least a portion of the set of canonical armature reference poses;

determining target skin position offset components corresponding with the target armature pose components, wherein the target skin position offset comprise at least a portion of the reference skin position offsets; and combining the target skin position offset components using a processor to determine a posed character model corresponding with the target armature pose;

wherein determining the target skin position offset components comprises:

determining first target skin position offset components corresponding with the target armature pose components transformed to a first reference frame associated with a first portion of the character model; and determining second target skin position offset components corresponding with the target armature pose components transformed to a second reference frame associated with a second portion of the character model; and wherein combining the target position offset components comprises combining the first target skin position offset components and the second target skin position offset components according to contributions of the first and second reference frames to the character model.

23. The method of claim 22, the method comprising:

receiving first contributions of the first and second reference frames, wherein the first contributions are associated with a first portion of the character model; and applying a spatial diffusion function to the first contributions of the first and second reference frames to determine second contributions of the first and second reference frames, wherein the second contributions are associated with a second portion of the character model;

wherein the contributions of the first and second reference frames to the character model include at least the first and second contributions.

24. The method of claim 22, the method comprising:

comparing the reference skin position offsets with a corresponding set of non-linear solutions to determine the contributions of the first and second reference frames to the character model.

25. The method of claim 22, the method comprising:

setting at least a portion of the contributions of the first and second reference frames to the character model to values received from a user.

26. The method of claim 22, wherein generating reference skin position offsets comprises:

assigning sets of armature position offsets determined from the set of sample armature poses to a first portion of the character model;

for each set of armature position offsets, determining a system of displacement functions associated with the first portion and at least a second portion of the character model;

minimizing the systems of displacement functions to determine minimized offsets; and determining the reference skin position offsets from portions of the minimized offsets.

27. The method of claim 17, wherein the systems of displacement functions includes a material energy function.

28. The method of claim 22, wherein generating the set of canonical armature reference poses comprises:

determining the set of canonical armature reference poses from the set of sample armature poses using a singular value decomposition.

29. The method of claim 22, wherein generating the set of canonical armature reference poses comprises:

determining the set of canonical armature reference poses from the set of sample armature poses using canonical correlation.

30. The method of claim 22, wherein the set of sample armature poses include a procedurally-created pose.

31. The method of claim 22, comprising:

rendering at least a portion of an image including at least a portion of the posed character model.

* * * * *